(12) United States Patent
Moon et al.

(10) Patent No.: US 10,952,039 B2
(45) Date of Patent: Mar. 16, 2021

(54) ELECTRONIC DEVICE AND METHOD FOR OPERATING SAME

(71) Applicant: Samsung Electronics Co., Ltd., Gyeonggi-do (KR)

(72) Inventors: Sun-Hee Moon, Gyeonggi-do (KR); Haemi Yoon, Seoul (KR); Jihun Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/067,683

(22) PCT Filed: Jan. 3, 2017

(86) PCT No.: PCT/KR2017/000033
§ 371 (c)(1),
(2) Date: Jul. 2, 2018

(87) PCT Pub. No.: WO2017/119690
PCT Pub. Date: Jul. 13, 2017

(65) Prior Publication Data
US 2019/0014451 A1 Jan. 10, 2019

(30) Foreign Application Priority Data
Jan. 5, 2016 (KR) .................. 10-2016-0000919

(51) Int. Cl.
*H04M 1/00* (2006.01)
*H04W 4/18* (2009.01)
(Continued)

(52) U.S. Cl.
CPC ................ *H04W 4/18* (2013.01); *G06F 3/14* (2013.01); *H04M 1/72522* (2013.01);
(Continued)

(58) Field of Classification Search
CPC . G06F 3/14; H04M 2250/16; H04M 1/72522; H04M 1/72583; H04W 88/02;
(Continued)

(56) References Cited

U.S. PATENT DOCUMENTS 8,874,721 B1 * 10/2014 Mirza ..................... H04L 41/22
709/224
9,152,404 B2 * 10/2015 Reeves ................. G06F 3/1423
(Continued)

FOREIGN PATENT DOCUMENTS

| CN | 102083030 A | 6/2011 |
| CN | 103729055 A | 4/2014 |

(Continued)

OTHER PUBLICATIONS

European Search Report dated Oct. 16, 2018.
Chinese Search Report dated Jun. 17, 2020.

*Primary Examiner* — Nhan T Le
(74) *Attorney, Agent, or Firm* — Cha & Reiter, LLC.

(57) ABSTRACT

Disclosed is a method for operating an electronic device. A method for operating an electronic device according to an exemplary embodiment includes a step of displaying a screen of a first application on a first screen from among a plurality of screens; and a step of using, for the operation of the first application, a first communication network corresponding to the first screen from among the plurality of communication networks.

15 Claims, 25 Drawing Sheets

(51) Int. Cl.
*H04W 88/06* (2009.01)
*H04W 4/00* (2018.01)
*H04W 76/15* (2018.01)
*G06F 3/14* (2006.01)
*H04M 1/725* (2021.01)
*H04W 48/18* (2009.01)

(52) U.S. Cl.
CPC ............ *H04W 4/00* (2013.01); *H04W 48/18* (2013.01); *H04W 76/15* (2018.02); *H04W 88/06* (2013.01)

(58) Field of Classification Search
CPC ....... H04W 48/18; H04W 4/12; H04W 76/10; H04W 8/24
See application file for complete search history.

(56) References Cited

U.S. PATENT DOCUMENTS

| | | |
|---|---|---|
| 2007/0275762 A1 | 11/2007 | Aaltone et al. |
| 2010/0257450 A1* | 10/2010 | Go .................... G06F 3/0481 715/733 |
| 2010/0298032 A1 | 11/2010 | Lee et al. |
| 2010/0313136 A1* | 12/2010 | Yoshizawa ........... G06F 3/0482 715/739 |
| 2012/0258707 A1 | 10/2012 | Mathias et al. |
| 2013/0150158 A1 | 6/2013 | Kang et al. |
| 2013/0176927 A1* | 7/2013 | Karaoguz ............. H04W 88/06 370/311 |
| 2014/0152576 A1 | 6/2014 | Kim et al. |
| 2015/0289185 A1* | 10/2015 | Kalapatapu .......... H04W 36/22 370/230 |
| 2017/0127346 A1 | 5/2017 | Min |

FOREIGN PATENT DOCUMENTS

| | | |
|---|---|---|
| CN | 104270534 A | 1/2015 |
| CN | 104284397 A | 1/2015 |
| KR | 10-2007-0005102 A | 1/2007 |
| KR | 10-0787945 B1 | 12/2007 |
| KR | 10-2010-0125938 A | 12/2010 |
| KR | 10-2011-0070628 A | 6/2011 |
| KR | 10-1459059 B1 | 11/2014 |
| WO | 2014/197339 A1 | 12/2014 |
| WO | 2015/199340 A1 | 12/2015 |

* cited by examiner

1680

| Application network setting | | |
|---|---|---|
| ☐ App 1 | ONLY FIRST COMMUNICATION NETWORK | — 1681 |
| ☐ App 2 | ALL | — 1682 |
| ☐ App 3 | ONLY SECOND COMMUNICATION NETWORK | — 1683 |
| ☐ App 4 | ALL | — 1684 |
| ☐ App 5 | ONLY SECOND COMMUNICATION NETWORK | — 1685 |
| ☐ App 6 | ONLY THIRD COMMUNICATION NETWORK | — 1686 |

FIG.16

ELECTRONIC DEVICE AND METHOD FOR OPERATING SAME

CROSS-REFERENCE TO RELATED APPLICATION

This application is a National Phase Entry of PCT International Application No. PCT/KR2017/000033, which was filed on Jan. 3, 2017, and claims priority to Korean Patent Application No. 10-2016-0000919, which was filed on Jan. 5, 2016, the contents of which are incorporated herein by reference.

TECHNICAL FIELD

Various embodiments of the present disclosure relate to an electronic device and a method for operating the same, for example, an electronic device using different communication networks for operations of applications respectively displayed on a plurality of screens of the electronic device, and a method for operating the electronic device.

BACKGROUND ART

Electronic devices are capable of displaying various information and contents on displays thereof, and receiving various inputs through the displays.

In this way, the display of the electronic device functions as an input device that receive an input as well as a display means that displays a screen.

With the development of display technologies, larger-size and higher-definition displays have been applied to electronic devices.

Users of electronic devices use the electronic devices in various positions and places, and thus the electronic devices have been used in various forms.

The electronic devices exchange data by using various communication networks which have different advantages and disadvantages in terms of stability, speed, available distance, billing, and so forth.

Hence, the users have selectively used the communication networks based on network environments.

DETAILED DESCRIPTION OF THE INVENTION

Technical Problem

As communication networks used by electronic devices have been diversified, simultaneous use of a plurality of communication networks rather than a single communication network is required.

Thus, there is a need for an electronic device and a method for operating the same in which the electronic device may use a communication network based on an executed application.

Moreover, a need also exists for an electronic device and a method for operating the same in which the electronic device may use a communication network based on a network environment of the electronic device.

In various embodiments of the present disclosure, different communication networks may be used for applications respectively displayed on a plurality of screens of the electronic device.

Also, in various embodiments of the present disclosure, a communication network to be used may be set for an operation of each of a plurality of applications executed on the electronic device, and thus the set communication network may be used for the operation of the application.

Technical Solution

According to various embodiments of the present disclosure, a method for operating an electronic device includes displaying a screen of a first application on a first screen among a plurality of screens and using, for an operation of the first application, a first communication network corresponding to the first screen among a plurality of communication networks.

According to various embodiments of the present disclosure, a method for operating an electronic device includes executing a first application, determining a communication network corresponding to the executed first application, and using the determined communication network for an operation of the executed first application.

According to various embodiments of the present disclosure, an electronic device includes a communication module configured to communicate through at least one communication network, a plurality of displays including a first display and a second display, a memory, and a processor electrically connected with the memory, in which the memory stores instructions for causing the processor, when executed, to display a screen of a first application on the first display and to use, for an operation of the first application, a first communication network corresponding to the first display among a plurality of communication networks.

According to various embodiments of the present disclosure, an electronic device includes a communication module configured to communicate through at least one communication network, a plurality of displays including a first display and a second display, a memory, and a processor electrically connected with the memory, in which the memory stores instructions for causing the processor, when executed, to execute a first application, to determine a communication network corresponding to the executed first application, and to use the determined communication network for an operation of the executed first application.

Advantageous Effects

According to various embodiments of the present disclosure, different communication networks may be used for applications respectively displayed on a plurality of screens of an electronic device. Thus, the electronic device according to various embodiments of the present disclosure may efficiently use the plurality of communication networks based on a network environment of the electronic device. Moreover, the present disclosure may provide a communication network suitable for characteristics of an application executed on the electronic device.

BRIEF DESCRIPTION OF DRAWINGS

FIG. 16 illustrates a communication network setting screen according to various embodiments of the present disclosure.

MODE FOR CARRYING OUT THE INVENTION

Figure 1:
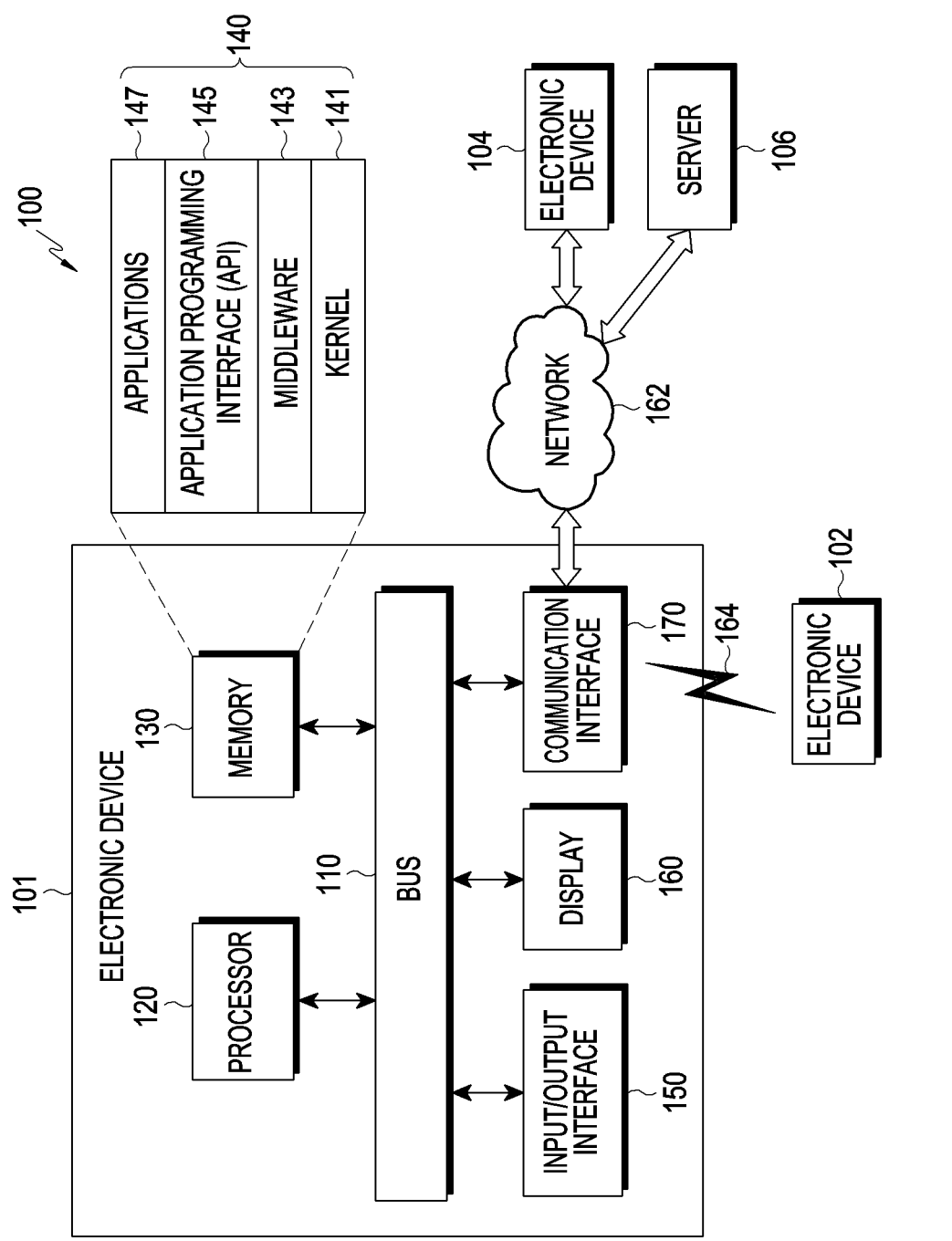
FIG. 1 is a block diagram of an electronic device and a network according to various embodiments of the present disclosure.

Hereinafter, various embodiments of the present disclosure will be disclosed with reference to the accompanying drawings. However, it should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

In the present disclosure, an expression such as "having," "may have," "comprising," or "may comprise" indicates existence of a corresponding characteristic (e.g., a numerical value, a function, an operation, or an element like a part) and does not exclude existence of additional characteristic.

As used herein, each of such phrases as "A or B," "at least one of A or/and B," "at least one or more of A or/and B," and so forth may include all possible combinations of the items enumerated together in a corresponding one of the phrases. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used herein may represent various elements regardless of order and/or importance and do not limit corresponding elements. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is "operatively or communicatively coupled with/to" or "connected" to another element (such as a second element), the element can be directly connected to the other element or can be connected to the other element through another element (e.g., a third element). However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device. A term "configured to (or set)" does not always mean only "specifically designed to" by hardware.

Terms defined in the present disclosure are used for only describing a specific exemplary embodiment and may not have an intention to limit the scope of other exemplary embodiments. The singular forms are intended to include the plural forms as well, unless the context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various exemplary embodiments. In some case, terms defined in the present disclosure cannot be analyzed to exclude the present exemplary embodiments.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. According to various embodiments, examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth.

According to some embodiments, the electronic device may be a home appliance. The home appliance may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, TV™ of Apple, or TV™ of Google), a game console, an electronic dictionary, an electronic key, a camcorder, and an electronic frame.

According to other embodiments of the present disclosure, the electronic device may include at least one of various medical equipment (for example, magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments, the electronic device may include a part of a furniture or building/structure, an electronic board, an electronic signature receiving device, a projector, and various measuring instruments (e.g., a water, electricity, gas, electric wave measuring device, etc.). The electronic device according to various embodiments of the present disclosure may be one of the above-listed devices or a combination thereof. The electronic device according to some embodiments may be a flexible electronic device. The electronic device according to various embodiments is not limited to the above-listed devices and may include new electronic devices according to technical development.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication module 170. According to some embodiments, the electronic device 101 may omit at least one of the foregoing elements or may further include other elements.

The bus 110 may include a circuit for connecting, e.g., the elements 110 to 170 and delivering communication (e.g., a control message and/or data) between the elements 110 to 170.

The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS).

The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141.

In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147. For example, the middleware 143 may perform scheduling or load balancing with respect to the one or more task requests by processing the one or more task requests based on the priority given to the at least one of the application programs 147.

The API 145 is an interface used for the application 147 to control a function provided by the kernel 141 or the middleware 143, and may include, for example, at least one interface or function (e.g., a command) for file control, window control, image processing or character control.

The I/O interface 150 serves as an interface for delivering, for example, a command or data input from a user or another external device to other component(s) of the electronic device 101. The I/O interface 150 may also output a command or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, a symbol, etc.) to users. The display 160 may include a touch screen, and receives a touch, a gesture, proximity, or a hovering input, for example, by using an electronic pen or a part of a body of a user.

The communication module 170 establishes communication between the electronic device 101 and an external device (e.g., a first external electronic device 102, a second external electronic device 104, or a server 106). For example, the communication module 170 may be connected to a network 462 through wireless communication or wired communication to communicate with an external device (e.g., the second external electronic device 104 or the server 106).

The wireless communication may use, as a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). The wired communication may include, for example, short-range communication 164. The short-range communication 164 may include, for example, at least one of WiFi, Bluetooth, NFC, and GNSS. Depending on a usage area or bandwidth, the GNSS may include, for example, at least one of a global positioning system (GPS), a global navigation satellite system (Glonass), a Beidou navigation satellite system ("Beidou"), and Galileo, and the European global satellite-based navigation system. Hereinbelow, "GPS" may be used interchangeably with "GNSS". The wired communication may include, for example, at least one of USB, a high definition multimedia interface (HDMI), recommended standard232 (RS-232), and a plain old telephone service (POTS). The network 462 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to an embodiment of the present disclosure, the server 106 may include a group of one or more servers. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

Figure 2:
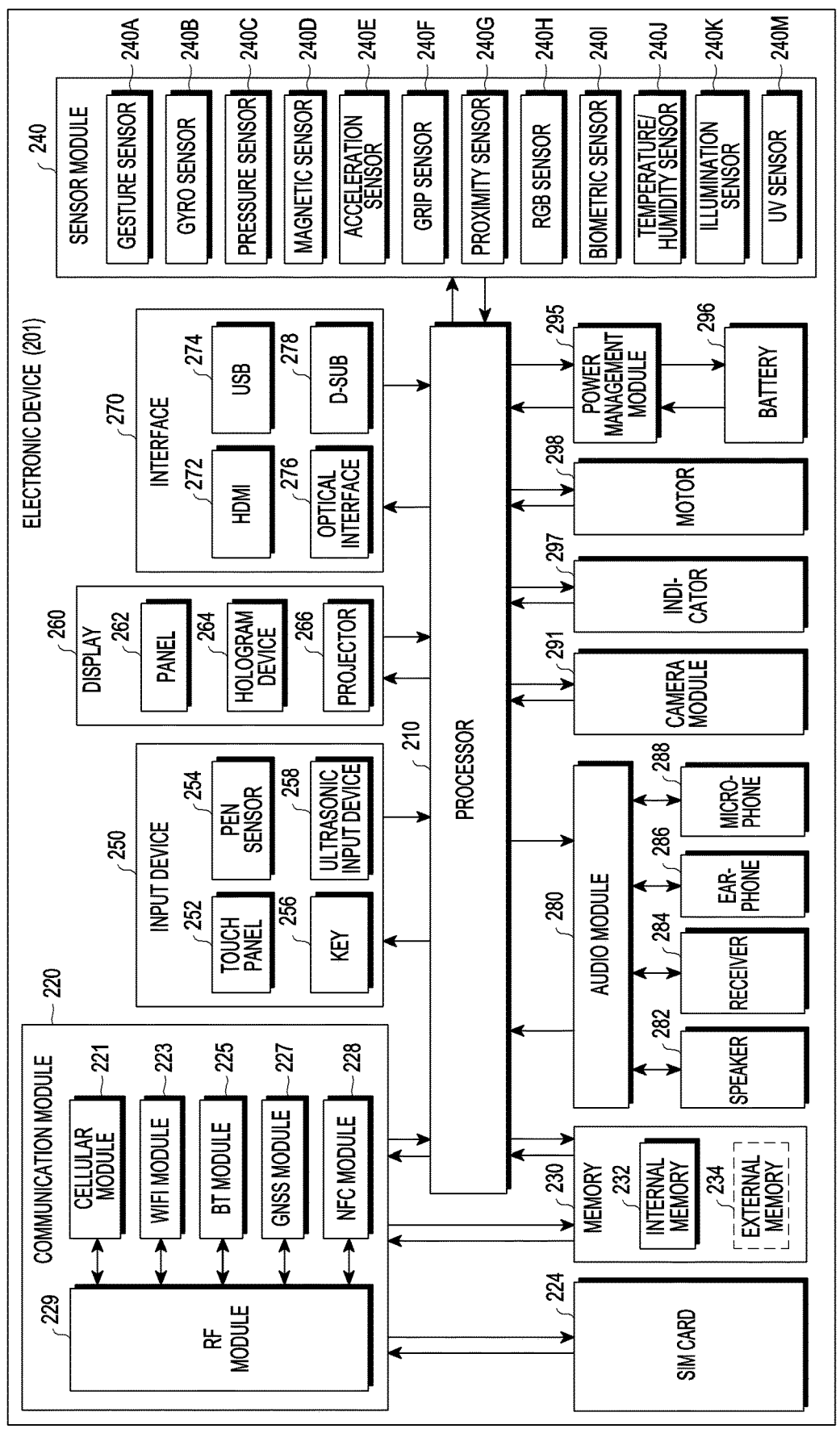
FIG. 2 is a block diagram of an electronic device according to various embodiments of the present disclosure.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 controls multiple hardware or software components connected to the processor 210 by driving an OS or an application program, and performs processing and operations with respect to various data. The processor 210 may be implemented with, for example, a system on chip (SoC). According to an embodiment of the present disclosure, the server 210 may include a GPU and/or an image signal processor. The processor 210 may include at least some of the elements illustrated in FIG. 2 (e.g., the cellular module 221). The processor 210 loads a command or data received from at least one of other elements (e.g., a non-volatile memory) into a volatile memory to process the command or data, and stores various data in the non-volatile memory.

The communication module 220 may have a configuration that is the same as or similar to the communication module 170 illustrated in FIG. 1. The communication module 220 may include, for example, at least one of the cellular module 221, a WiFi module 223, a Bluetooth (BT) module 225, a GNSS module 227 (e.g., a GPS module, a Glonass module, a Beidou module, or a Galileo module), an NFC module 228, and a radio frequency (RF) module 229.

The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 performs at least one of functions that may be provided by the processor 210. According to an embodiment, the cellular module 221 may include a communication processor (CP).

Each of the WiFi module 223, the BT module 225, the GNSS module 227, and the NFC module 228 may include, for example, a processor for processing data transmitted and received by a corresponding module. According to an embodiment, at least some (e.g., two or more) of the cellular module 221, the WiFi module 223, the BT module 225, the GNSS module 227, and the NFC module 228 may be included in one integrated chip (IC) or IC package.

The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module.

The SIM 224 may, for example, include a card including a SIM and/or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may include, for example, at least one of a volatile memory (e.g., a dynamic random-access memory (DRAM), static RAM (SRAM), a synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, NAND flash memory, NOR flash memory, etc.), and a solid-state drive (SSD).

The external memory 234 may further include flash drive, for example, compact flash (CF), secure digital (SD), micro-SD, mini-SD, extreme Digital (xD), a multi-media card (MMC), or a memory stick. The external memory 234 may be functionally and/or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user.

The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, or a projector 266. The panel 262 may have a configuration that is the same as or similar to the display 160 illustrated in FIG. 1. The panel 262 may be implemented to be flexible, transparent, or wearable. The panel 262 may be configured with the touch panel 252 in one module. The hologram device 264 shows a stereoscopic image in the air by using interference of light. The projector 266 displays an image onto a screen through projection of light. The screen may be positioned inside or outside the electronic device 201. According to an embodiment, the display 260 may further include a control circuit for controlling the panel 262, the hologram device 264, or the projector 266.

According to an embodiment, the interface 270 may include a high-definition multimedia interface (HDMI) 272, a universal serial bus (USB) 274, an optical communication 276, or a D-subminiature 278. The interface 270 may be included in the communication module 170 illustrated in FIG. 1. Additionally or alternatively, the interface 270 may include, for example, a mobile high-definition link (MHL) interface, an SD card/MMC interface, or an Infrared Data Association (IrDA) interface.

The audio module 280 bi-directionally converts sound and an electric signal. At least some element of the audio module 280 may be included, for example, in the I/O interface 150 illustrated in FIG. 1. The audio module 280 processes sound information input or output through the speaker 282, the receiver 284, the earphone 286, or the microphone 288.

The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.).

The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and may further include an additional circuit for wireless charging, for example, a coil loop, a resonance circuit, or a rectifier. The battery gauge measures the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. Although not shown, the electronic device 201 may include a processing device (e.g., a GPU) for supporting a mobile TV. The processing device for supporting the mobile TV processes media data according to, a standard such as digital multimedia broadcasting (DMB), digital video broadcasting (DVB), or mediaFlo™.

Figure 3:
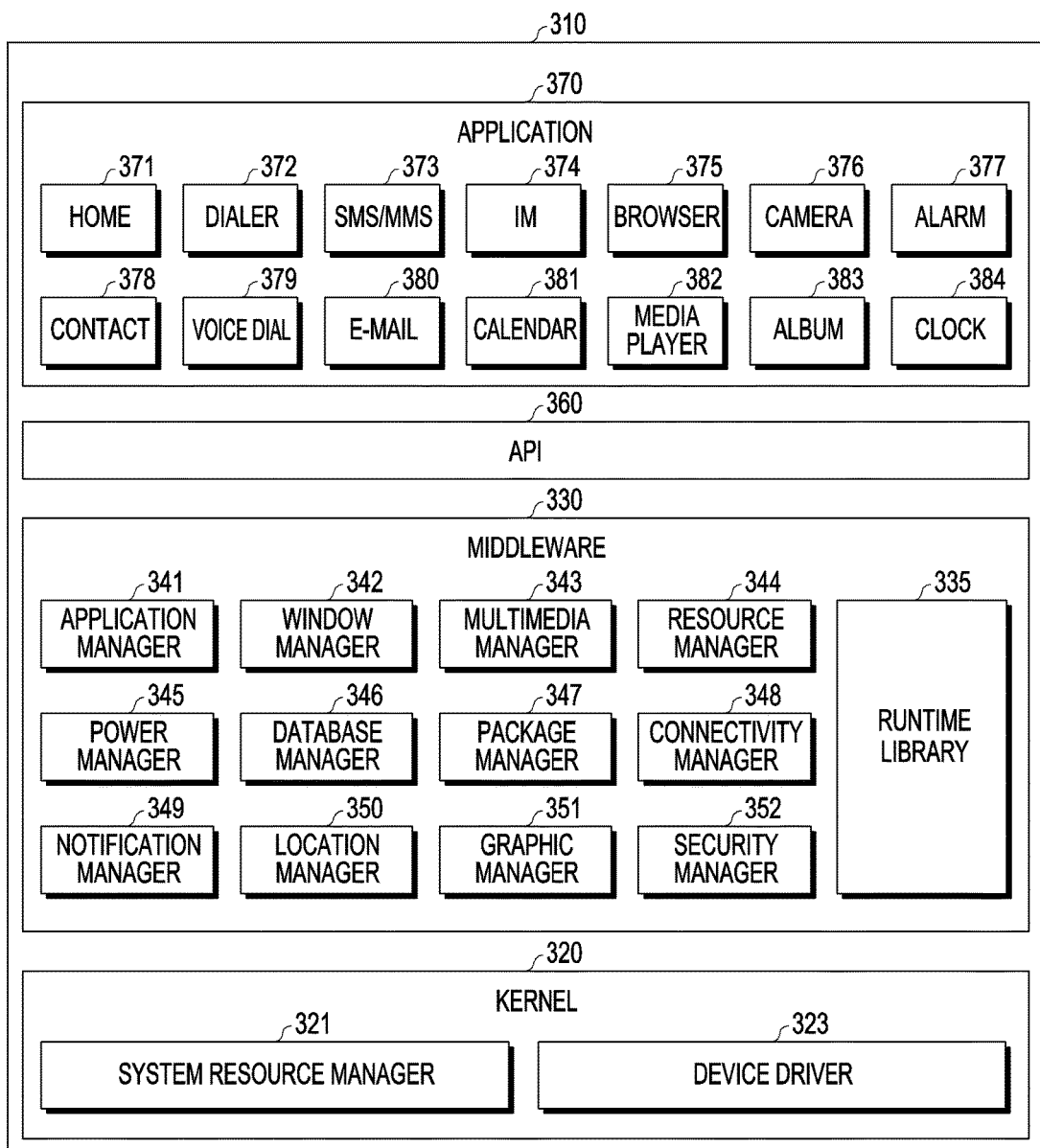
FIG. 3 is a block diagram of a programming module according to various embodiments of the present disclosure.

FIG. 3 is a block diagram of a programming module according to various embodiments. According to an embodiment, a programming module 310 (e.g., the program 140) may include an OS for controlling resources associated with an electronic device (e.g., the electronic device 101) and/or various applications (e.g., the application program 147) executed on the OS. The OS may include, for example, Android™, iOS™, Windows™, Symbian™, Tizen™, Bada™, or the like.

The programming module 310 may include, for example, a kernel 320, middleware 330, an application programming interface (API) 360, and/or an application 370. At least a part of the programming module 310 may be preloaded on an electronic device or may be downloaded from an external device (e.g., the external device 102 or 104 or the server 106).

The kernel 320 (e.g., the kernel 141) may include, for example, a system resource manager 321 and/or a device driver 323. The system resource manager 321 may perform control, allocation, retrieval of system resources, and so forth. According to an embodiment, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may include provide functions that the application 370 commonly requires or provide various functions to the application 370 through the API 360 to allow the application 370 to efficiently use a limited system resource in an electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs functions related to an input/output, memory management, or calculation operation.

The application manager 341 manages a life cycle of at least one of the applications 370. The window manager 342 manages a GUI resource used on a screen. The multimedia manager 343 recognizes a format necessary for playing various media files and performs encoding or decoding on a media file by using a codec appropriate for a corresponding format. The resource manager 344 manages a resource such as source code, memory, or storage space of at least one application among the applications 370.

The power manager 345 manages a battery or power, for example, in operation with a basic input/output system (BIOS) and provides power information necessary for an operation of the electronic device. The database manager 346 performs a management operation to generate, search or change a database used for at least one application among the applications 370. The package manager 347 manages the installation or update of an application distributed in a package file format.

The connectivity manager 348 manages a wireless connection such as a WiFi or Bluetooth connection. The notification manager 349 displays or notifies events such as arrival messages, appointments, and proximity alerts in a manner that is not disruptive to a user. The location manager 350 manages location information of an electronic device. The graphic manager 351 manages a graphic effect to be provided to a user or a user interface relating thereto. The security manager 352 provides a general security function necessary for system security or user authentication. According to an embodiment, if the electronic device (e.g., the electronic device 101) has a call function, the middleware 330 may further include a telephony manager for managing a voice or video call function of the electronic device.

The middleware 330 may include a middleware module forming a combination of various functions of the above-mentioned internal elements. The middleware 330 may provide modules specified according to types of OS so as to provide distinctive functions. Additionally, the middleware 330 may delete some of existing elements or add new elements dynamically.

The API 360 (e.g., the API 145) may be provided as a set of API programming functions with a different configuration according to the OS. For example, in Android or iOS, one API set may be provided for each platform, and in Tizen, two or more API sets may be provided for each platform.

The application 370 (e.g., the application program 147) may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like).

According to an embodiment, the application 370 may include an application (hereinafter, an "information exchange application" for convenience) supporting information exchange between the electronic device (e.g., the electronic device 101) and an external electronic device (e.g., the electronic device 102 or 104). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the electronic device 102 or 104). The notification relay application may receive notification information from an external electronic device to provide the same to a user.

The device management application may manage (e.g., install, remove, or update) at least one function (e.g., turn on/turn off of an external electronic device itself (or a part thereof) or control of brightness (or resolution) of a display) of an external device (e.g., the electronic device 102 or 104) communicating with the electronic device, a service provided by an application operating in an external electronic device or provided by the external electronic device (e.g., a call service or a message service).

According to an embodiment, the application 370 may include an application (e.g., device health care application of mobile medical equipment) designated according to an attribute of the external electronic device (e.g., the electronic device 102 or 104). According to an embodiment, the application 370 may include an application received from the external electronic device (e.g., the server 106 or the electronic device 102 or 104). According to an embodiment, the application 370 may include a preloaded application or a third-party application that may be downloaded from the server. Names of elements of the programming module 310 according to the illustrated embodiment may vary depending on a type of an OS.

According to various embodiments, at least a part of the programming module 310 may be implemented by software, firmware, hardware, or a combination of at least two of them. The at least a part of the programming module 310 may be implemented (e.g., executed) by a processor (e.g., the processor 210). At least some of the programming module 310 may include, for example, modules, programs, routines, sets of instructions, or processes for performing one or more functions.

Each of the foregoing elements of the electronic device may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

As used herein, the term "module" may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or part thereof, adapted to perform one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with a command stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

Figure 4:
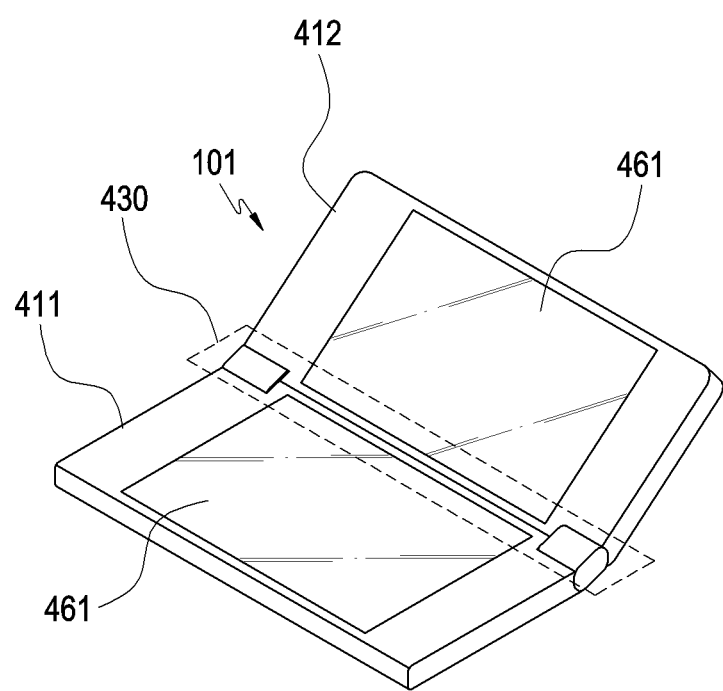
FIG. 4 illustrates an electronic device including a plurality of displays according to various embodiments of the present disclosure.

FIG. 4 illustrates an electronic device including a plurality of displays according to various embodiments of the present disclosure.

Referring to FIG. 4, the electronic device 101 may include a plurality of displays, a first display 461 and a second display 462. The first display 461 and the second display 462 may include touch screens. Thus, the electronic device 101 may receive a touch, a gesture, proximity, or a hovering input made by an electronic pen or a body part of a user with respect to at least one of the first display 461 and the second display 462. The first display 461 may be included in a first body 411, and the second display 462 may be included in a second body 412. The first body 411 including the first display 461 may be pivotally coupled with the second body 412 including the second display 462. For example, the first body 411 and the second body 412 may be connected by a connecting part 430 to pivot with respect to each other. In an embodiment, the connecting part 430 may include a hinge to allow the first body 411 and the second body 412 to pivot with respect to each other. In another embodiment, the connecting part 430 may include a flexible or stretchable member to allow the first body 411 and the second body 412 to pivot with respect to each other. Thus, the first body 411 and the second body 412 may pivot such that the first display 461 and the second display 462 face each other. Moreover, the first body 411 and the second body 412 may pivot such that the first display 461 and the second display 462 oppose each other.

The above description of the electronic device 101 including the plurality of displays is a descriptive example, and the number and arrangement of displays included in the electronic device 101 may be variously applied.

The electronic device 101 according to various embodiments may use different communication networks for an operation of each of a plurality of applications respectively displayed on the plurality of displays included in the electronic device 101.

Figure 5:
FIG. 5 is a conceptual view showing network use according to various embodiments of the present disclosure.

FIG. 5 is a conceptual view showing network use according to various embodiments of the present disclosure.

Referring to FIG. 5, the electronic device 101, e.g., the processor 120 may display screens of different applications, a first application and a second application, on the plurality of displays, the first display 461 and the second display 462, respectively. The processor 120 may use a first communication network for an operation of the first application displayed on the first screen of the first display 461, and a second communication network for an operation of the second application displayed on the second screen of the second display 462. Herein, a communication network corresponding to each of the plurality of displays may be variously set based on user setting. This will be described later.

In an embodiment, the electronic device 101, e.g., the processor 120 may use a secured communication network for an application displayed on the first screen of the first display 461, and a general communication network, e.g., a communication provider network, for an application displayed on the second screen of the second display 462.

In another embodiment, the electronic device 101, e.g., the processor 120 may use a communication network having a high data rate and asking no charge, e.g., a WiFi communication network, for an application displayed on the first screen of the first display 461, and a communication network asking a charge, but rapid response and high stability, e.g., an LTE communication network, for an application displayed on the second screen of the second display 462.

In another embodiment, the electronic device 101, e.g., the processor 120 may use a no-charge communication network, a public communication network, for an application displayed on the first screen of the first display 461, and a communication provider network asking a charge for an application displayed on the second screen of the second display 462.

A detailed embodiment will be described with reference to FIG. 6.

Figure 6:
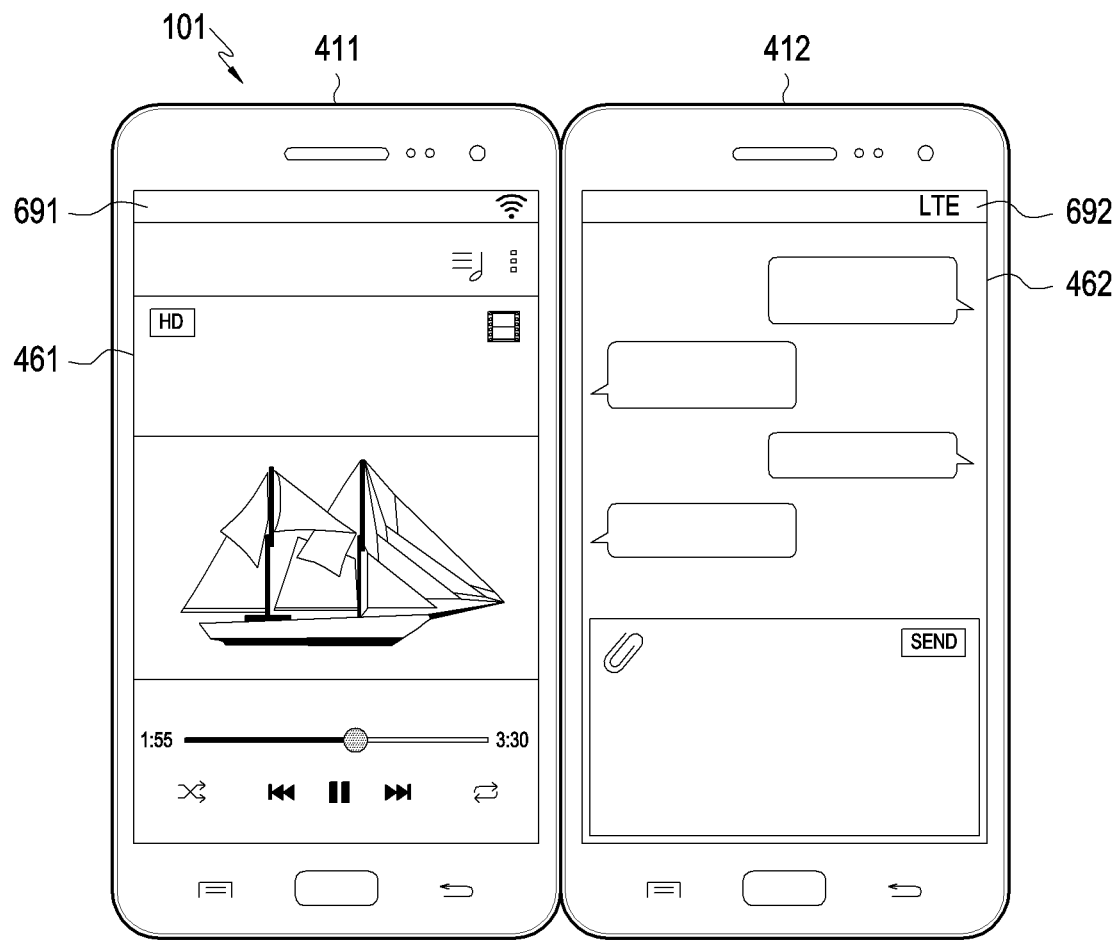
FIG. 6 illustrates network use by a plurality of applications according to various embodiments of the present disclosure.

FIG. 6 illustrates network use by a plurality of applications according to various embodiments of the present disclosure.

Referring to FIG. 6, the electronic device 101, e.g., the processor 120 may display a video streaming application on the first screen of the first display 461 and a message application on the second screen of the second display 462. The processor 120 may use the WiFi communication network for an operation of the video streaming application displayed on the first screen and the LTE communication network for an operation of the message application displayed on the second screen. The processor 120 may display an indication of a communication network used for each of a plurality of applications on a status bar of each of a plurality of displays. Thus, the processor 120 may indicate the WiFi network on a first status bar 691 on an upper-end portion of the first display 461 and the LTE network on a second status bar 692 on an upper-end portion of the second display 462.

The electronic device 101 according to various embodiments may receive an input of setting of a dual network mode for using different communication networks for the plurality of applications respectively displayed on the plurality of displays.

Figure 7:
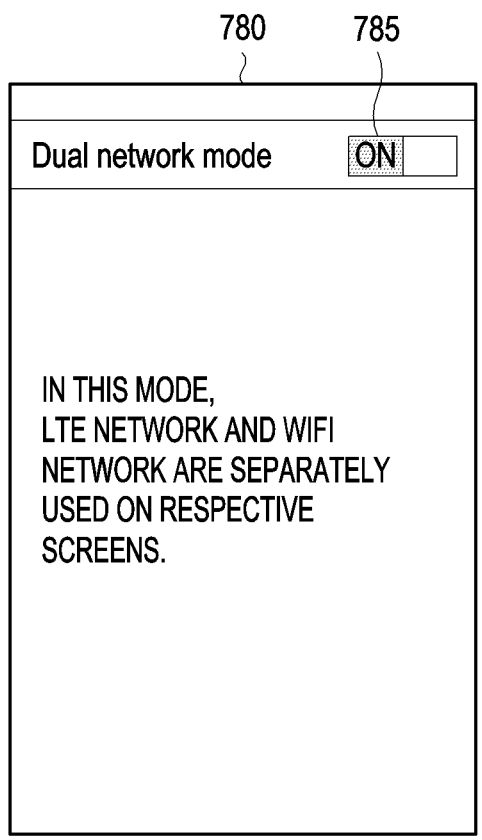
FIG. 7 illustrates a dual network mode setting screen according to various embodiments of the present disclosure.

FIG. 7 illustrates a dual network mode setting screen according to various embodiments of the present disclosure.

Referring to FIG. 7, the electronic device 101, e.g., the processor 120 may display a dual network mode setting screen 780 on the display 160. The electronic device 101, e.g., the processor 120 may display a setting tab 785 for activating the dual network mode. In an embodiment, the processor 120 may turn on the dual network mode upon obtaining an input of swiping the setting tab 785 to the left, and may turn off the dual network mode upon obtaining an input of swiping the setting tab 785 to the right. The electronic device 101, e.g., the processor 120 may display a description related to the dual network mode on the dual network mode setting screen 780. The electronic device 101 according to various embodiments may also receive various setting inputs related to the dual network mode as well as the above-described inputs.

The electronic device 101 according to various embodiments may determine a communication network corresponding to an application displayed on each of a plurality of displays and use the determined communication network.

Figure 8:
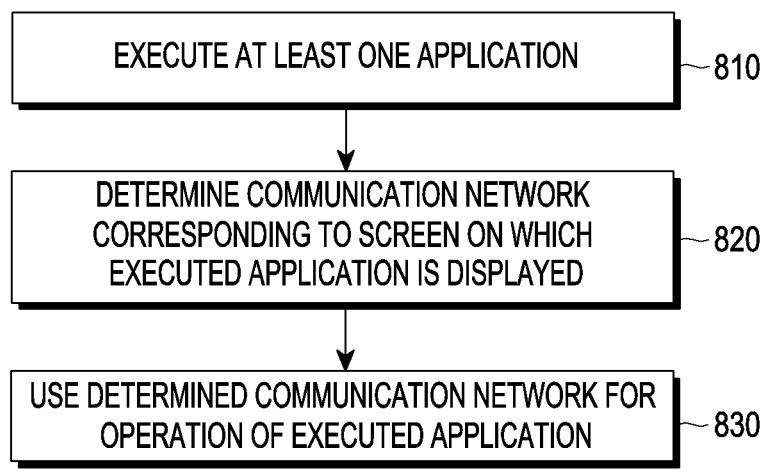
FIG. 8 is a flowchart illustrating a method for operating an electronic device according to various embodiments of the present disclosure.

FIG. 8 is a flowchart illustrating a method for operating an electronic device according to various embodiments of the present disclosure.

In operation 810, the electronic device 101, e.g., the processor 120 executes at least one application. In an embodiment, upon obtaining an input for executing an application, the processor 120 executes the application corresponding to the input. The processor 120 displays a screen of the executed application on any one of a plurality of displays. For example, the processor 120 may display the screen of the executed application on the first display 461 out of the plurality of displays, the first display 461 and the second display 462. Herein, a screen displayed on the first display 461 may be referred to as a first screen and a screen displayed on the second display 462 may be referred to as a second screen.

In operation 820, the electronic device 101, e.g., the processor 120 determines a communication network corresponding to the screen on which the executed application is displayed. For example, the processor 120 may determine a screen on which the executed application is displayed among a plurality of screens corresponding to the plurality of displays, respectively. The processor 120 determines a communication network corresponding to the determined screen among a plurality of network services. Herein, the plurality of communication networks may mean networks for communication belonging to any one of the above-described wireless communication or wired communication. For example, the plurality of communication networks may include at least one of LTE, LTE-A, CDMA, WCDMA, UMTS, WiBro, GSM, WiFi, Bluetooth, NFC, GNSS, USB, HDMI, RS-232, POTS, a computer network (e.g., a LAN or WAN), or a telephone network.

In an embodiment, the electronic device 101, e.g., the processor 120 determines a screen on which the executed application is displayed among the plurality of displays, the first display 461 and the second display 462. The electronic device 101, e.g., the processor 120 determines a communication network corresponding to the screen on which the executed application is displayed.

For example, when the first screen of the first display 461 corresponds to the first communication network and the second screen of the second display 462 corresponds to the second communication network, the electronic device 101, e.g., the processor 120 may determine a communication network corresponding to the first screen as a first communication network if the first application is displayed on the first screen, and may determine a communication network corresponding to the second screen as a second communication network if the second application is displayed on the second screen.

In operation 830, the electronic device 101, e.g., the processor 120 uses the determined communication network for an operation of the executed application. In an embodiment, the electronic device 101, e.g., the processor 120 uses the determined communication network, the first communication network for an operation of the first application displayed on the first screen of the first display 461. Thus, the electronic device 101 uses the first communication network in a communication operation related to the operation of the first application. In another embodiment, the electronic device 101, e.g., the processor 120 uses the determined communication network, the second communication network for an operation of the first application displayed on the second screen of the second display 462. Thus, the electronic device 101 uses the second communication network in a communication operation related to the operation of the second application. In another embodiment, the electronic device 101, e.g., the processor 120 may use the determined communication network, the first communication network, for the operation of the first application displayed on the first screen of the first display 461, and the determined communication network, the second communication network, for the operation of the second application displayed on the second screen of the second display 462. Thus, the electronic device 101 uses the first communication network in a communication operation related to the first application and the second communication network in a communication operation related to the operation of the second application. The electronic device 101 may use different communication networks for an operation of each of a plurality of different applications respectively displayed on the plurality of displays.

When a screen of an application displayed on any one of the plurality of displays is moved to another display, the electronic device 101 according to various embodiments may use a communication network corresponding to the screen of the other display for an operation of the application.

Figure 9:
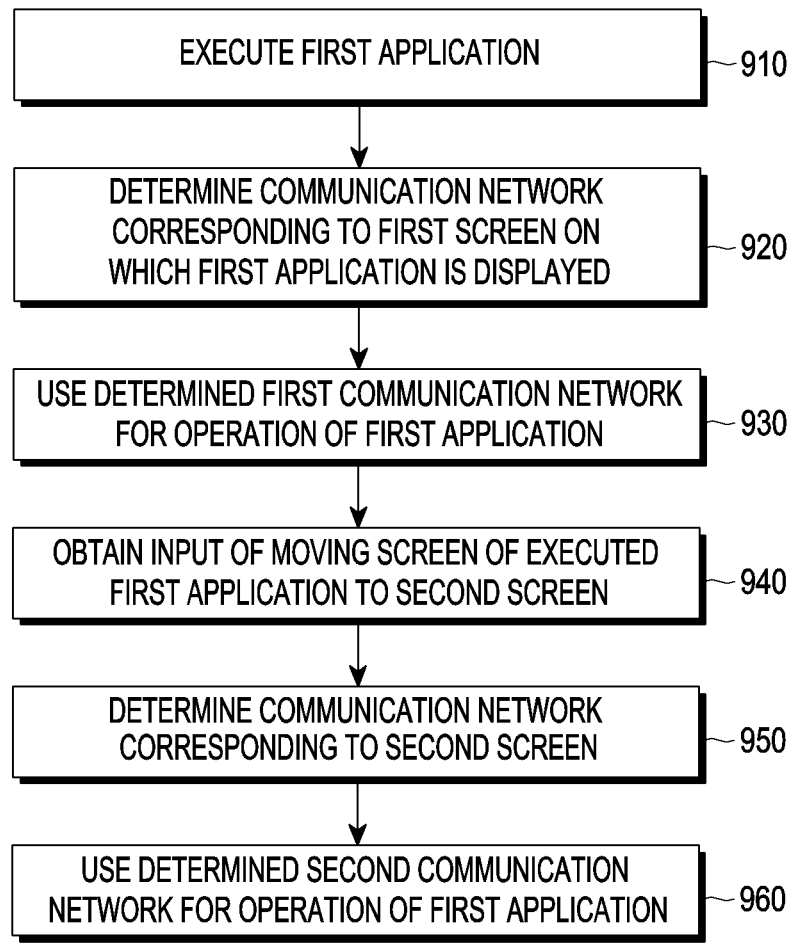
FIG. 9 is a flowchart illustrating a method for operating an electronic device according to various embodiments of the present disclosure.

FIG. 9 is a flowchart illustrating a method for operating an electronic device according to various embodiments of the present disclosure.

In operation 910, the electronic device 101, e.g., the processor 120 executes a first application. In operation 920, the electronic device 101, e.g., the processor 120 determines a communication network corresponding to the first screen of the first display 461 on which the first application is displayed. For example, the processor 120 may determine the communication network corresponding to the first display 461 as a first communication network. In operation 930, the electronic device 101, e.g., the processor 120 uses the determined first communication network for an operation of the first application. In operation 940, the electronic device 101, e.g., the processor 120 obtains an input of moving the screen of the first application displayed on the first screen of the first display 461 to the second screen of the second display 462. In operation 950, the electronic device 101, e.g., the processor 120 determines a communication network corresponding to the second screen of the second display 462 to which the first application is moved. For example, the processor 120 may determine the communication network corresponding to the second display 462 as a second communication network. In operation 960, the electronic device 101, e.g., the processor 120 uses the determined second communication network for the operation of the first application.

Figure 10:
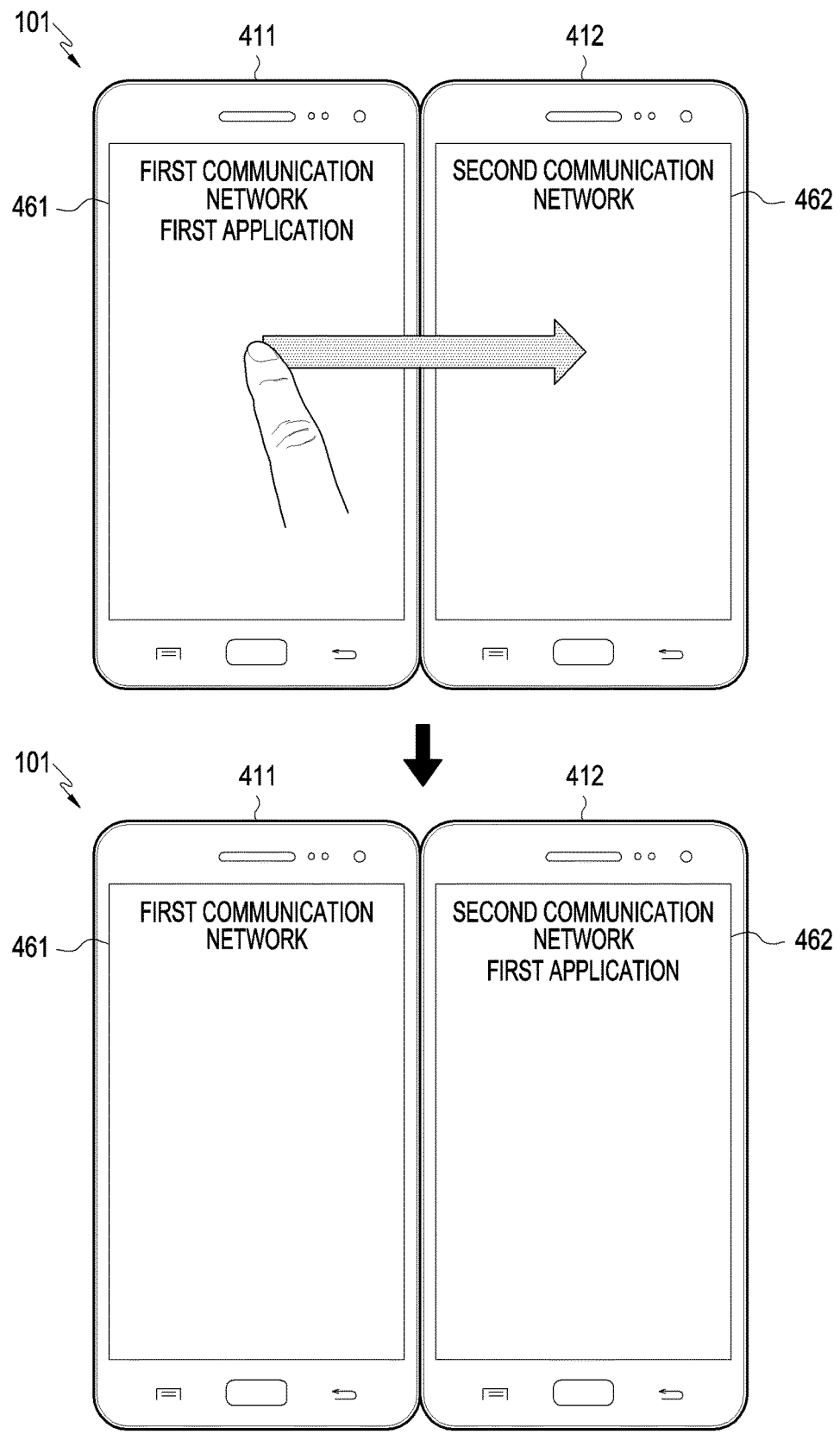
FIG. 10 illustrates communication network use for inter-screen movement according to various embodiments of the present disclosure.

FIG. 10 illustrates communication network use for inter-screen movement according to various embodiments of the present disclosure.

Referring to FIG. 10, the electronic device 101, e.g., the processor 120 uses the first communication network for the operation of the first application displayed on the first display 461. The electronic device 101, e.g., the processor 120 may receive an input of moving the screen of the first application displayed on the first display 461 to the second display 462. The electronic device 101, e.g., the processor 120 displays the screen of the first application on the second display 462 according to the input. The electronic device 101, e.g., the processor 120 uses the second communication network corresponding to the second display 462 for the operation of the first application.

A detailed embodiment will be described with reference to FIG. 11.

Figure 11:
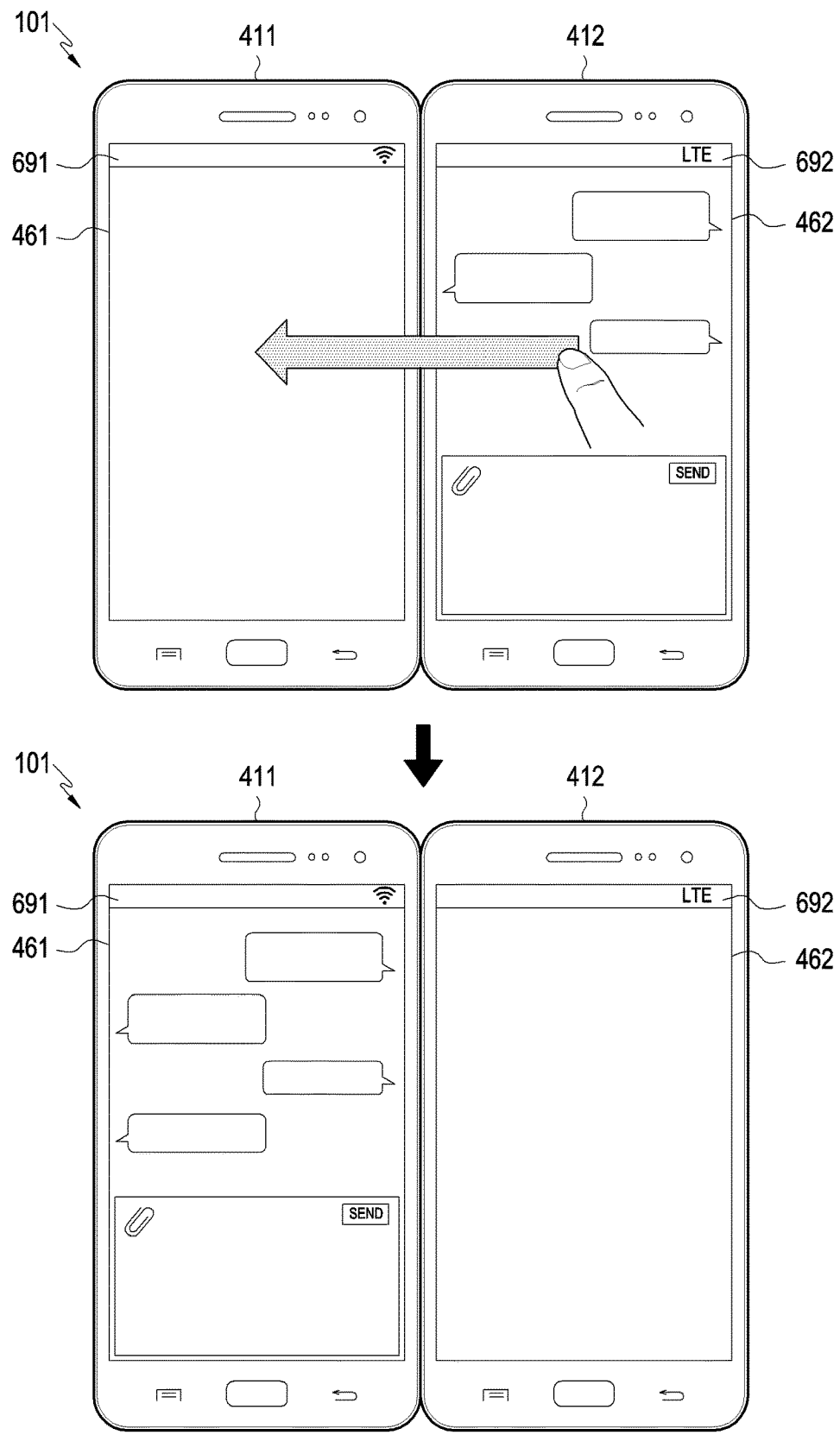
FIG. 11 illustrates communication network use for inter-screen movement according to various embodiments of the present disclosure.

FIG. 11 illustrates communication network use for inter-screen movement according to various embodiments of the present disclosure.

Referring to FIG. 11, the electronic device 101, e.g., the processor 120 may display an LTE communication network corresponding to the second display 462 for an operation of the message application displayed on the second display 462. The electronic device 101, e.g., the processor 120 may receive an input of moving the screen of the message application displayed on the second display 462 to the first display 461. The electronic device 101, e.g., the processor 120 may display the screen of the message application on the first display 461 according to the input. The electronic device 101 according to various embodiments uses the WiFi communication network corresponding to the first display 461 for the operation of the message application.

Upon receipt of an execution input for executing at least one application, the electronic device 101 according to various embodiments uses a communication network corresponding to a screen of a display onto which the execution input is made.

Figure 12:
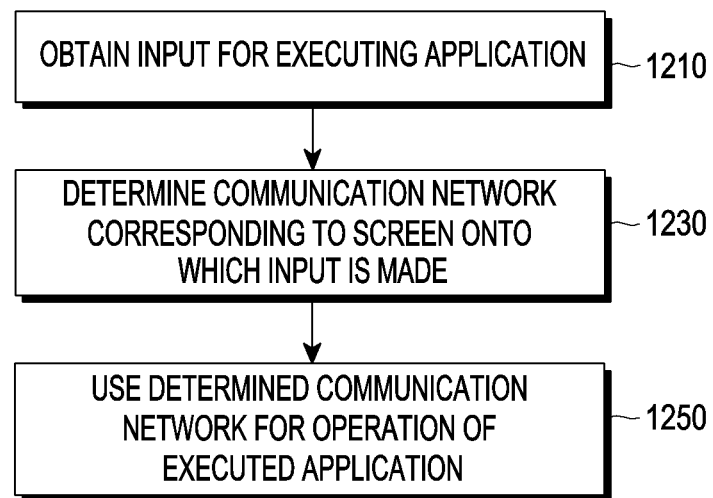
FIG. 12 is a flowchart illustrating a method for operating an electronic device according to various embodiments of the present disclosure.

FIG. 12 is a flowchart illustrating a method for operating an electronic device according to various embodiments of the present disclosure.

In operation 1210, the electronic device 101, e.g., the processor 120 obtains an input for executing at least one application. In operation 1230, the electronic device 101, e.g., the processor 120 determines a communication network corresponding to a screen onto which the input for executing the application is input. In operation 1250, the electronic device 101 uses the determined communication network for an operation of the executed application.

Figure 13:
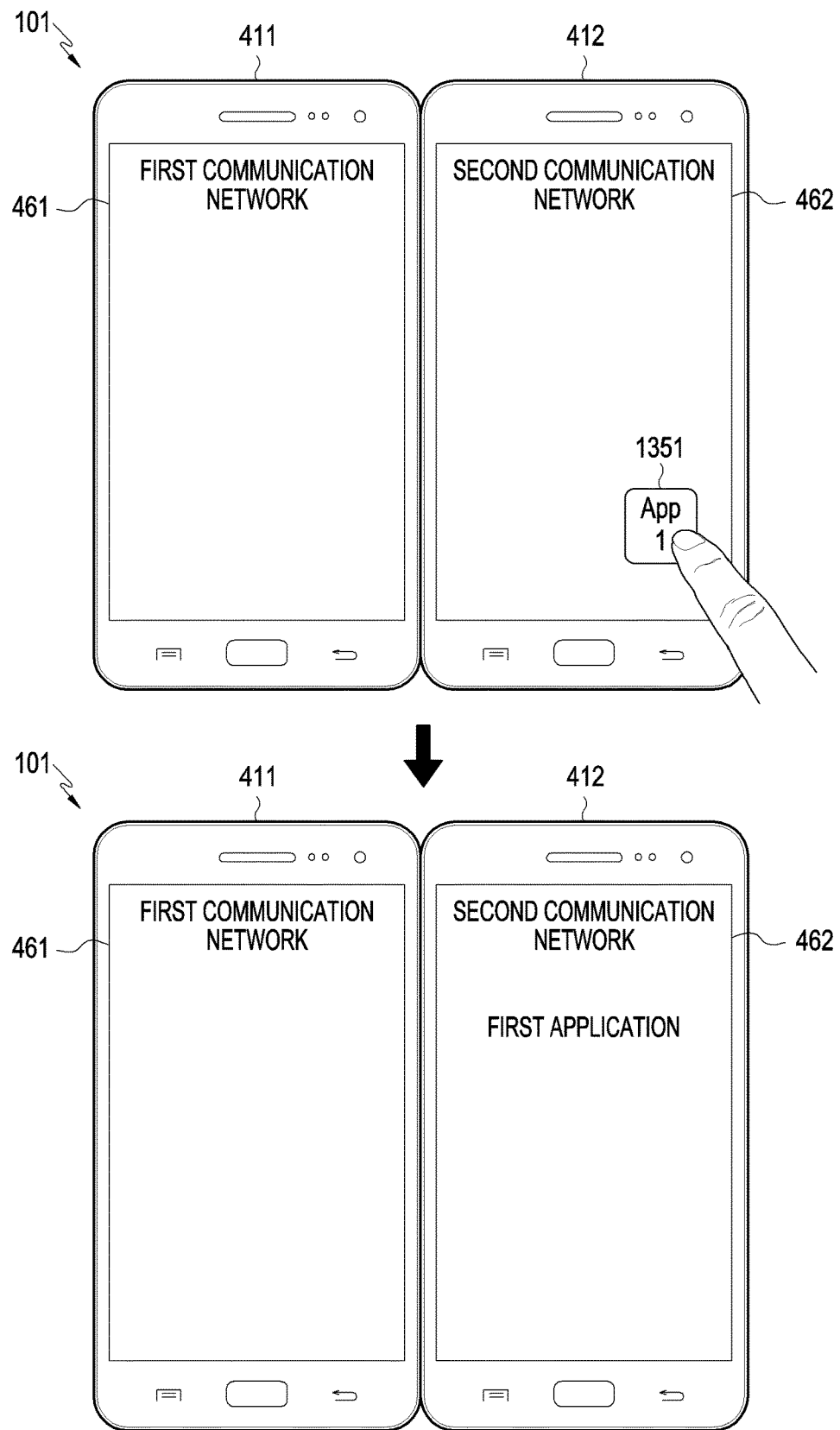
FIG. 13 illustrates communication network use for application execution according to various embodiments of the present disclosure.

FIG. 13 illustrates communication network use for application execution according to various embodiments of the present disclosure.

Referring to FIG. 13, the electronic device 101, e.g., the processor 120 obtains an input of double-tapping a first application icon 1351 displayed on the second display 462 as the input for executing the first application. The electronic device 101, e.g., the processor 120 executes the first application in response to the obtained input. The electronic device 101, e.g., the processor 120 determines a communication network corresponding to the screen of the second display 462 onto which the input for executing the first application is input. For example, the processor 120 may determine the communication network corresponding to the screen of the second display 462 onto which the input for executing the first application is input, as the second communication network. Thus, the electronic device 101, e.g., the processor 120 may use the determined second communication network for the operation of the executed first application.

Figure 14:
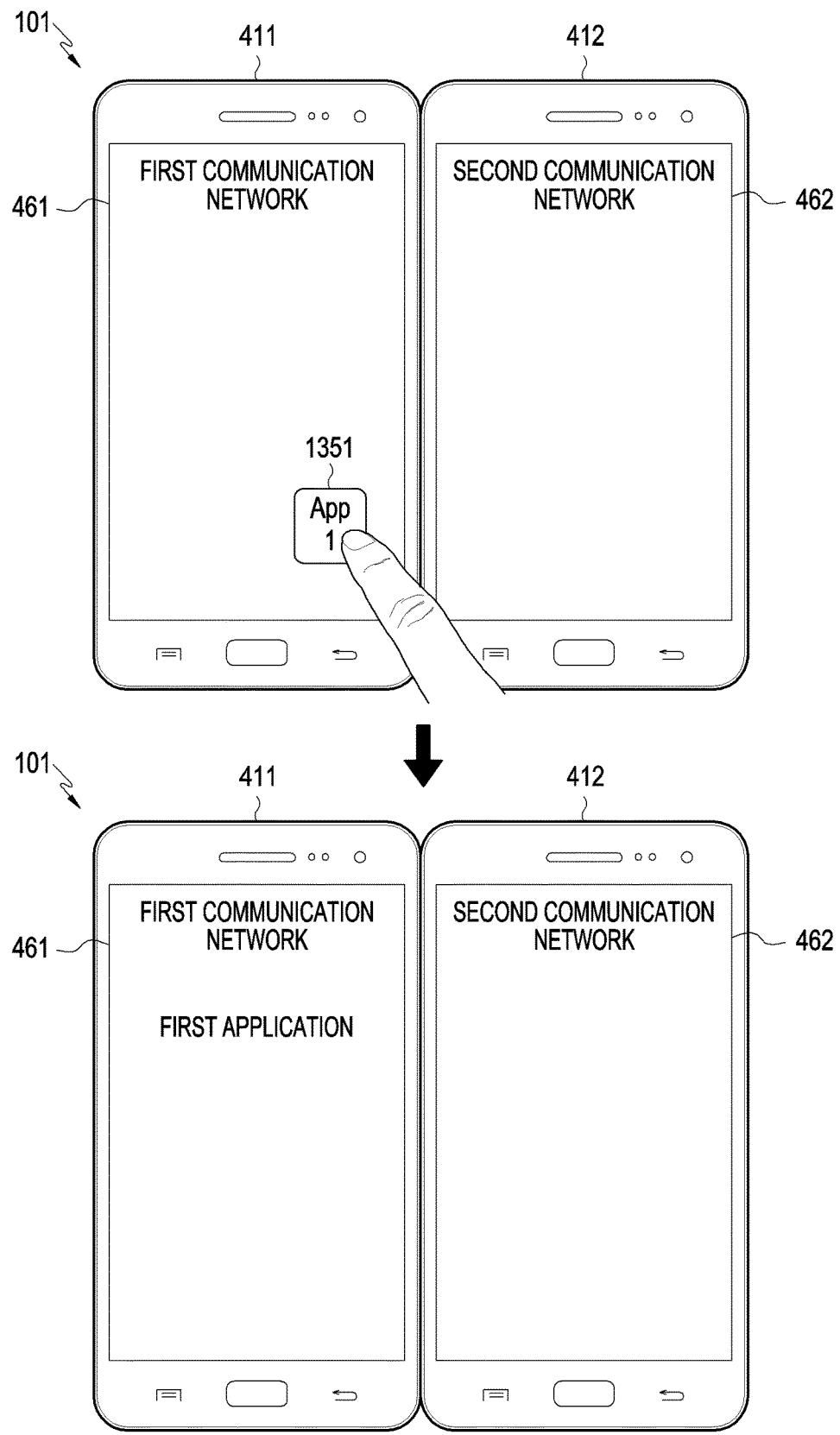
FIG. 14 illustrates communication network use for application execution according to various embodiments of the present disclosure.

FIG. 14 illustrates communication network use for application execution according to various embodiments of the present disclosure.

Referring to FIG. 14, the electronic device 101, e.g., the processor 120 obtains an input of double-tapping the first application icon 1351 displayed on the first display 461 as the input for executing the first application. The electronic device 101, e.g., the processor 120 executes the first application in response to the obtained input. The electronic device 101, e.g., the processor 120 determines a communication network corresponding to the screen of the first display 461 onto which the input for executing the first application is input. For example, the processor 120 may determine the communication network corresponding to the screen of the first display 461 onto which the input for executing the first application is input, as the first communication network. The electronic device 101, e.g., the processor 120 uses the determined first communication network for the operation of the executed first application.

The electronic device 101 according to various embodiments may receive a setting input for a communication network to be used for application execution and use the communication network set based on the input setting in application execution.

Figure 15:
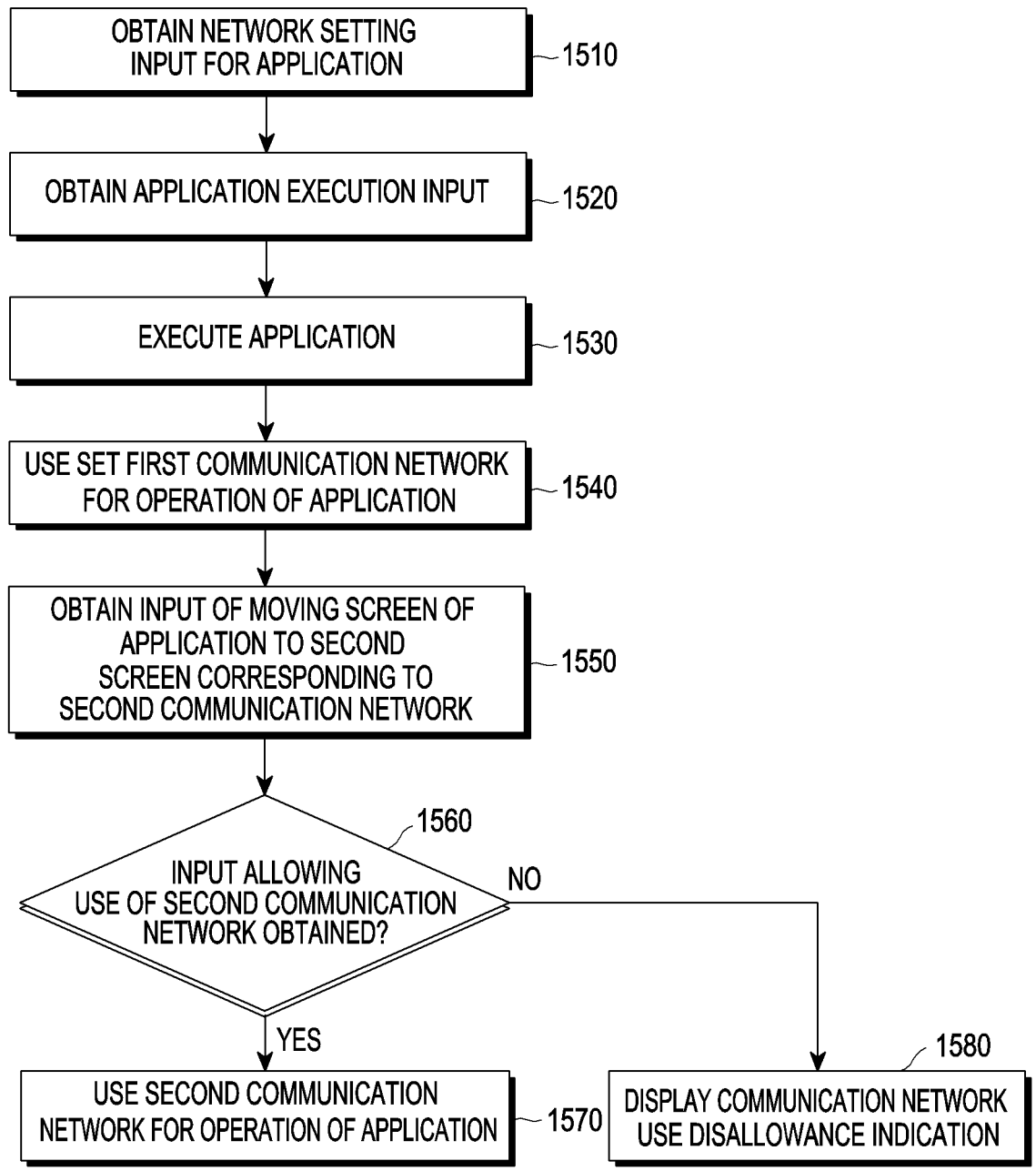
FIG. 15 is a flowchart illustrating a method for operating an electronic device according to various embodiments of the present disclosure.

FIG. 15 is a flowchart illustrating a method for operating an electronic device according to various embodiments of the present disclosure.

In operation 1510, the electronic device 101, e.g., the processor 120 obtains a network setting input for at least one application. In an embodiment, the processor 120 obtains setting for a communication network to be used in execution of each of a plurality of applications. Herein, setting for a communication network to be used for application execution may include various settings such as information about the communication network to be used in application execution, use conditions of the communication network, and so forth.

An embodiment will be described with reference to FIG. 16.

FIG. 16 illustrates a communication network setting screen according to various embodiments of the present disclosure.

Referring to FIG. 16, the electronic device 101, e.g., the processor 120 may display a communication network setting screen 1680 for communication network setting of at least one application on the display 160. Herein, the display 160 may be any one of the plurality of displays, the first display 461 and the second display 462. The electronic device 101 may display communication network setting tabs 1681 through 1686 for a plurality of applications, first through sixth applications, on the displayed communication network setting screen 1680. The electronic device 101, e.g., the processor 120 may obtain a setting input for a communication network to be used in execution of each of the plurality of applications, the first through sixth applications, in each of the communication network setting tabs 1681 through 1686 for each of the first through sixth applications. In an embodiment, the electronic device 101, e.g., the processor 120 may receive an input such that the first application uses only the first communication network, an input such that the second application and the fourth application use all communication networks, an input such that the third application and the fifth application use only the second communication network, and an input such that the sixth application uses only the third communication network.

The above description of the communication network setting is a descriptive example, and various settings related to communication network setting may be input according to selection of a user or a designer.

Reference will be made back to FIG. 15.

In operation 1520, the electronic device 101, e.g., the processor 120 obtains an execution input for executing at least one application. In operation 1530, the electronic device 101, e.g., the processor 120 executes at least one application corresponding to the obtained input. The electronic device 101, e.g., the processor 120 may display a screen of the executed application on the display 160. In an embodiment, the electronic device 101, e.g., the processor 120 displays the screen of the executed application on any one of the plurality of displays, the first display 461 and the second display 462.

In operation 1540, the electronic device 101, e.g., the processor 120 uses the set first communication network for an operation of the executed application. In an embodiment, when the communication network set for the first application is the first communication network, the electronic device 101, e.g., the processor 120 uses the first communication network for the operation of the executed first application. In another embodiment, when the communication network set for the third application is the second communication network, the electronic device 101 may use the set second communication network for an operation of the executed third application.

In operation 1550, the electronic device 101, e.g., the processor 120 obtains an input of moving the screen of the displayed application to the second screen corresponding to the second network. In an embodiment, the electronic device 101, e.g., the processor 120 may obtain an input of moving the screen of the first application displayed on the first display 461 to the second display 462. In another embodiment, the electronic device 101, e.g., the processor 120 may obtain an input of moving the screen of the third application displayed on the second display 462 to the first display 461. The electronic device 101, e.g., the processor 120 displays the screen of the application on the screen of the first display 461 according to the obtained input.

In operation 1560, the electronic device 101, e.g., the processor 120 determines whether an input allowing use of the second communication network corresponding to the screen of the first display 461 is obtained. For example, the electronic device 101 may obtain an input regarding whether to allow the first application having been set to use the first communication network to use the second communication network corresponding to the second screen to which the screen of the first application is moved.

An embodiment will be described with reference to FIG. 17.

Figure 17:
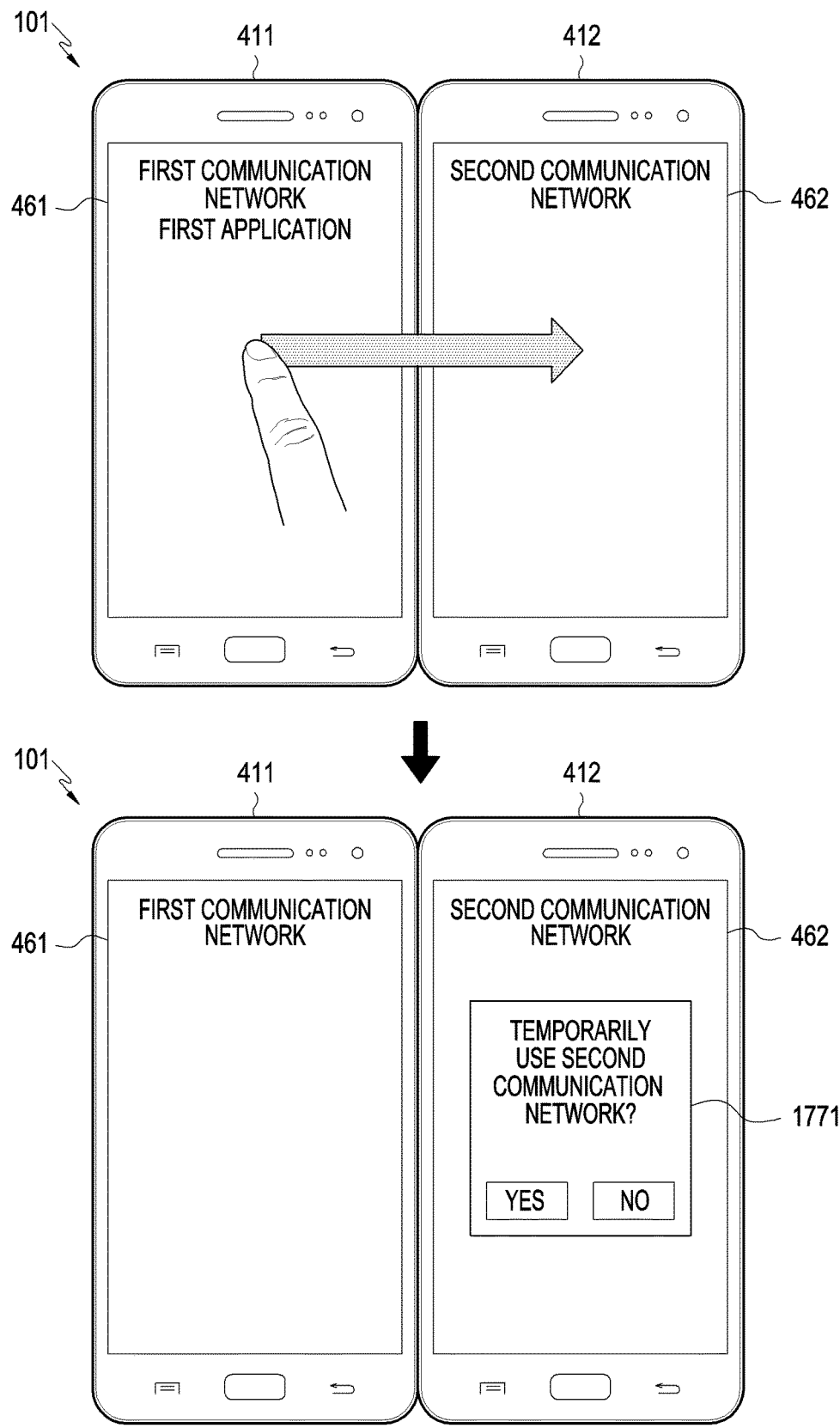
FIG. 17 illustrates a communication network use allow input screen according to various embodiments of the present disclosure.

FIG. 17 illustrates a communication network use allow input screen according to various embodiments of the present disclosure.

Referring to FIG. 17, the electronic device 101, e.g., the processor 120 obtains an input of moving the screen of the first application displayed on the first screen of the first display 461 to the second screen of the second display 462. Herein, the first screen may correspond to the first communication network and the second screen may correspond to the second communication network. The first application may be set to use the first communication network. The electronic device 101, e.g., the processor 120 displays the screen of the first application on the second screen of the second display 462 according to the input. The electronic device 101, e.g., the processor 120 displays a popup window 1771 regarding whether to use the second communication network corresponding to the second screen for the operation of the first application displayed on the second screen. The electronic device 101, e.g., the processor 120 may obtain an input regarding whether to use the second communication network corresponding to the second screen instead of the set first communication network, for the operation of the first application, based on an input with respect to the popup window 1771. Thus, the electronic device 101, e.g., the processor 120 may use or may not use the second communication network for the operation of the first application, based on the input regarding whether to use the second communication network.

The above description of use of the communication network for the application based on inter-screen movement is merely an example and the present disclosure is not limited thereto. Hence, the communication network may be used variously for the operation of the application depending on the selection of the user or designer.

Reference will be made back to FIG. 15.

In operation 1570, when obtaining an input allowing the first application to use the second communication network corresponding to the second screen to which movement is made, the electronic device 101, e.g., the processor 120 uses the second communication network for the operation of the first application.

In operation 1580, when failing to obtain the input allowing the first application to use the second communication network corresponding to the second screen to which movement is made, the electronic device 101, e.g., the processor 120 may not be able to use the second communication network for the operation of the first application. Thus, the electronic device 101 displays a communication network use disallowance indication indicating that use of the second communication network is not allowed for the operation of the first application on the display 160 corresponding to the second screen.

Figure 18:
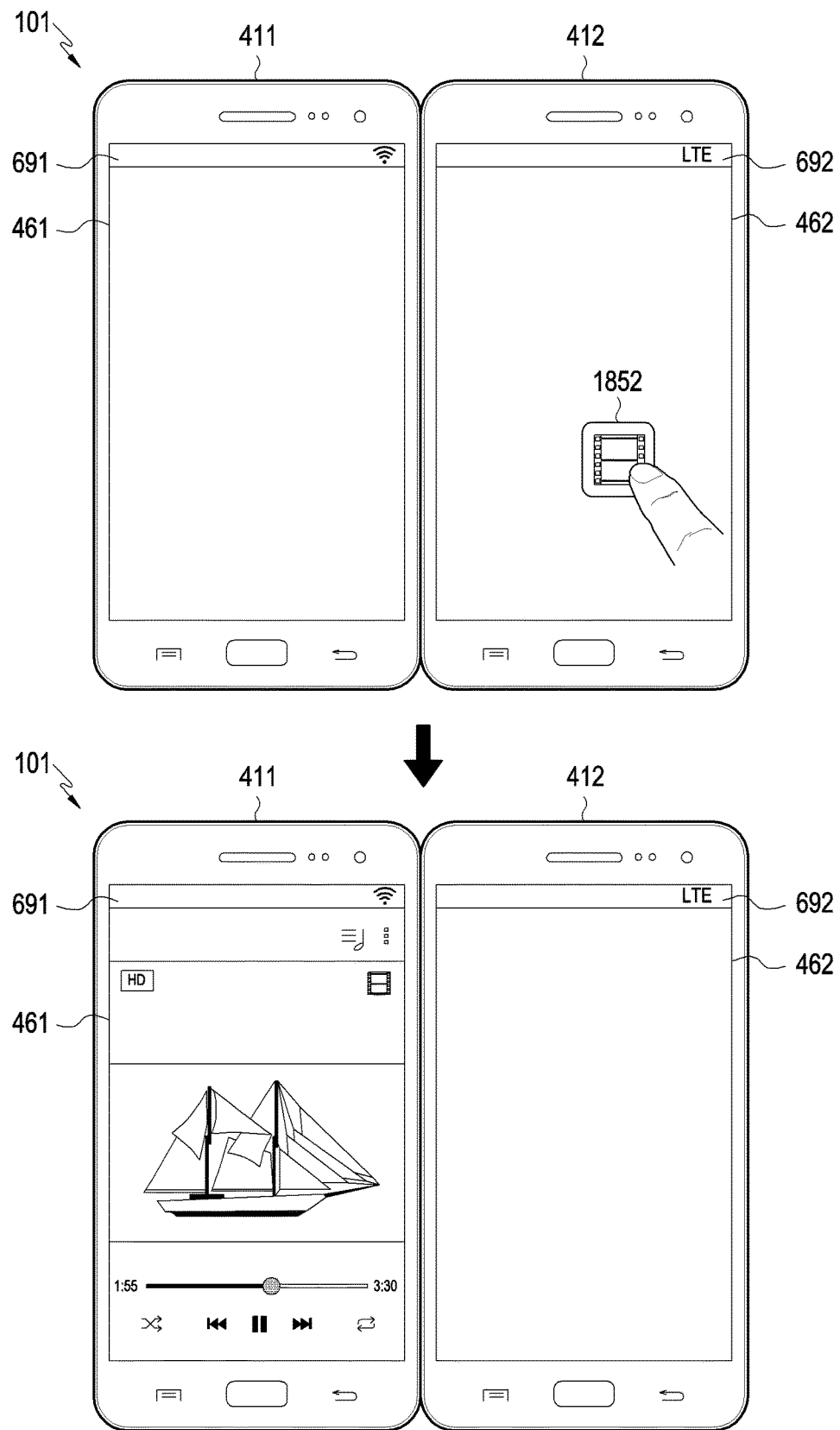
FIG. 18 illustrates execution of a video streaming application according to various embodiments of the present disclosure.
Figure 19:
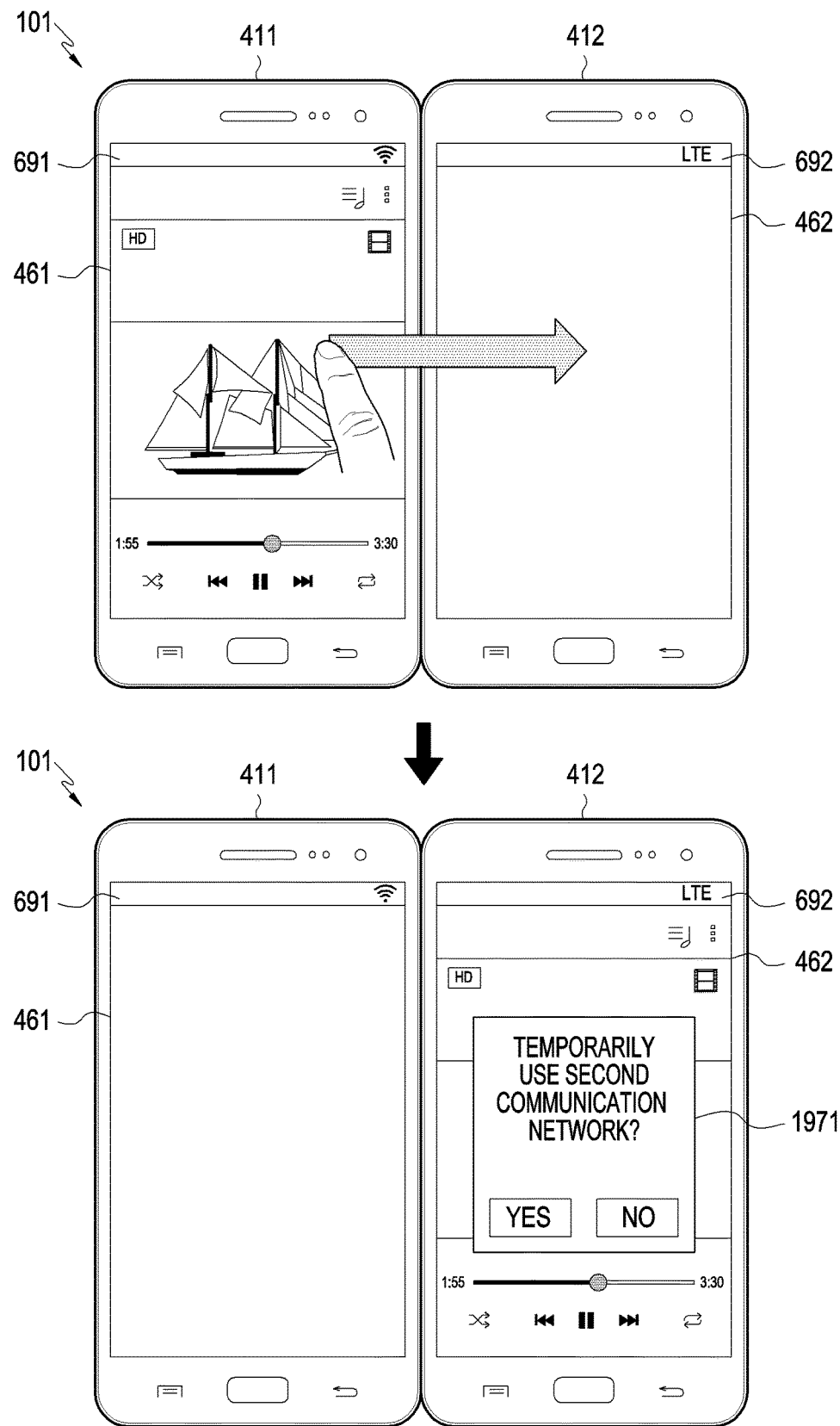
FIG. 19 illustrates displaying of a pop-up window regarding communication network use for inter-screen movement of a video streaming application according to various embodiments of the present disclosure.

With reference to FIGS. 18 and 19, a description will be made of an embodiment of an operation corresponding to a communication network set for an application for which network communication is set.

FIG. 18 illustrates execution of a video streaming application according to various embodiments of the present disclosure.

Referring to FIG. 18, the electronic device 101, e.g., the processor 120 obtains an input of double-tapping a video streaming application icon 1852 for executing the video streaming application. Herein, the video streaming application may be set to use the WiFi communication network. Thus, the electronic device 101, e.g., the processor 120 displays the screen of the executed video streaming application on the first screen of the first display 461 corresponding to the WiFi communication network. The electronic device 101, e.g., the processor 120 uses the WiFi communication network for the operation of the video streaming application.

FIG. 19 illustrates displaying of a pop-up window regarding communication network use for inter-screen movement of a video streaming application according to various embodiments of the present disclosure.

Referring to FIG. 19, the electronic device 101, e.g., the processor 120 uses the WiFi communication network for the operation of the video streaming application displayed on the first screen of the first display 461. Herein, the video streaming application may be set to use the WiFi communication network. The electronic device 101, e.g., the processor 120 obtains an input of moving the video streaming application displayed on the first screen of the first display 461 to the second screen of the second display 462. Thus, the electronic device 101, e.g., the processor 120 may display the screen of the video streaming application on the second screen. The electronic device 101, e.g., the processor 120 displays a popup window 1971 regarding whether to use the LTE communication network corresponding to the second screen instead of the set WiFi communication network, for the operation of the video streaming application displayed on the second screen of the second display 462. The electronic device 101, e.g., the processor 120 may obtain an input regarding whether to use the LTE communication network corresponding to the second screen instead of the set WiFi communication network, for the operation of the video streaming application, based on an input with respect to the popup window 1971. Thus, the electronic device 101, e.g., the processor 120 may use or may not use the LTE communication network for the operation of the video streaming application, based on the input regarding whether to use the LTE communication network.

The electronic device 101 according to various embodiments may use only one of a plurality of communication networks for an operation of an application displayed on at least one of a plurality of displays.

In an embodiment, once the electronic device 101, e.g., the processor 120 is connected to the WiFi communication network, the first screen of the first display 461 may be set to use only the WiFi communication network and an application displayed on the first screen may use only the WiFi communication network.

Figure 20:
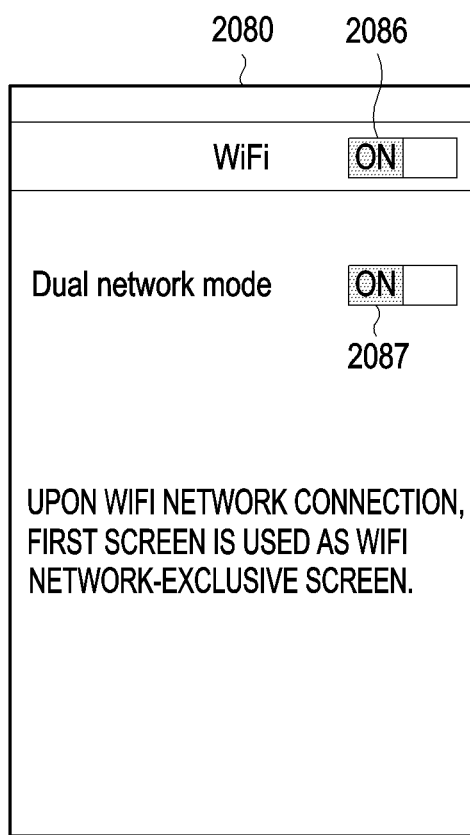
FIG. 20 illustrates communication network setting according to various embodiments of the present disclosure.

FIG. 20 illustrates communication network setting according to various embodiments of the present disclosure.

Referring to FIG. 20, the electronic device 101, e.g., the processor 120 may display a setting screen 2080 for the WiFi communication network on the display 160. The electronic device 101, e.g., the processor 120 displays a first setting tab 2086 regarding whether to activate the WiFi communication network and activates the WiFi communication network based on an input with respect to the first setting tab 2086. The electronic device 101, e.g., the processor 120 displays a second setting tab 2087 regarding dual network mode setting for setting one of a plurality of screens or a plurality of displays to use only the WiFi communication network, when connected to the WiFi communication network, and sets an application displayed on the screen nor the display to use only the WiFi communication network, when connected to the WiFi communication network based on an input with respect to the second setting tab 2087.

The electronic device 101 according to various embodiments displays an icon of at least one application corresponding to a currently used communication network on a screen of a display.

In an embodiment, the electronic device 101 may display an icon of at least one application requiring security on the first screen when a communication network corresponding to the first screen is a secured communication network.

This will be described with reference to FIG. 21.

Figure 21:
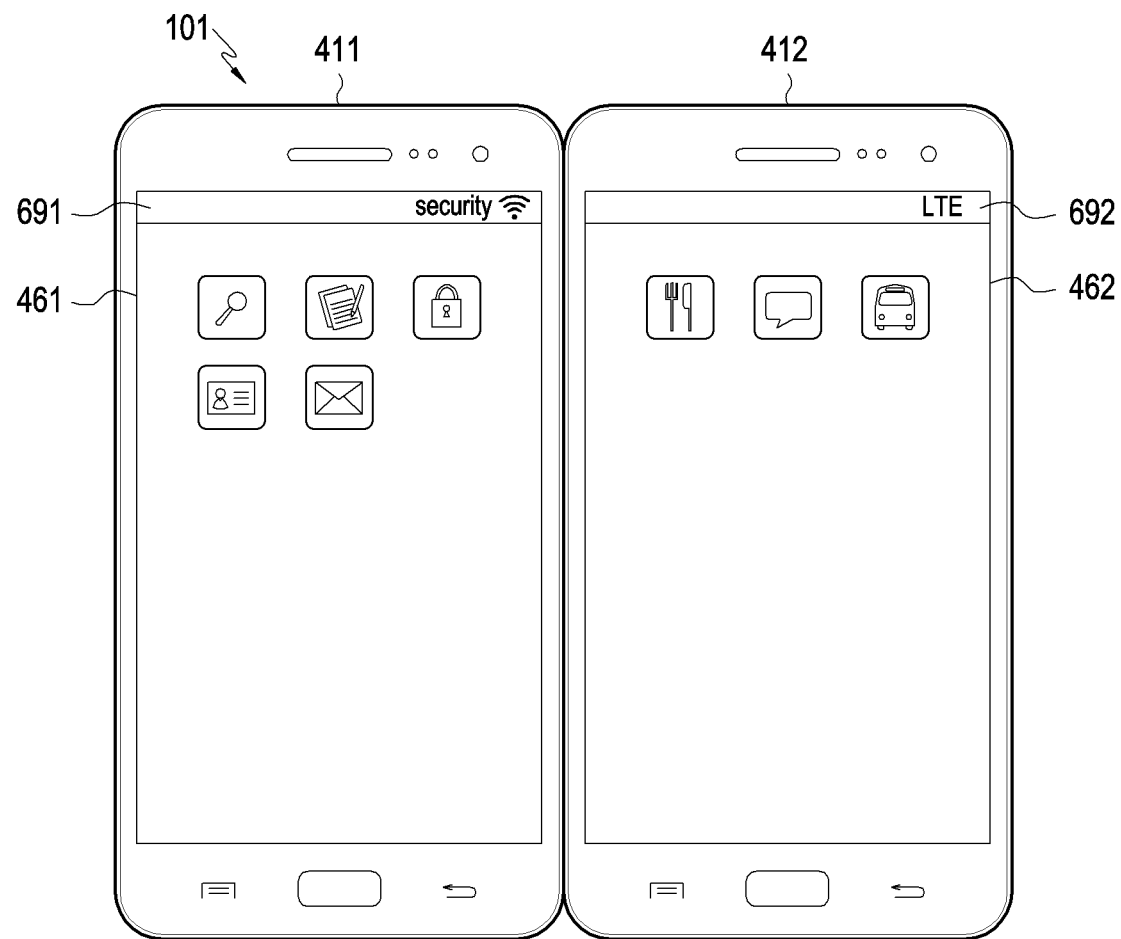
FIG. 21 illustrates displaying of icons corresponding to a secured communication network according to various embodiments of the present disclosure.

FIG. 21 illustrates displaying of icons corresponding to a secured communication network according to various embodiments of the present disclosure.

Referring to FIG. 21, the electronic device 101, e.g., the processor 120 may display an icon of at least one application corresponding to connected secured WiFi on the first display 461. For example, the processor 120 may display applications related to business such as a search application, a document application, a security setting application, a contact application, and a mail application.

In another embodiment, the electronic device 101 may display an icon of at least one application having frequency data use on the first screen when a communication network corresponding to the first screen is a communication network that supports high speed or asks no charge.

This will be described with reference to FIG. 22.

Figure 22:
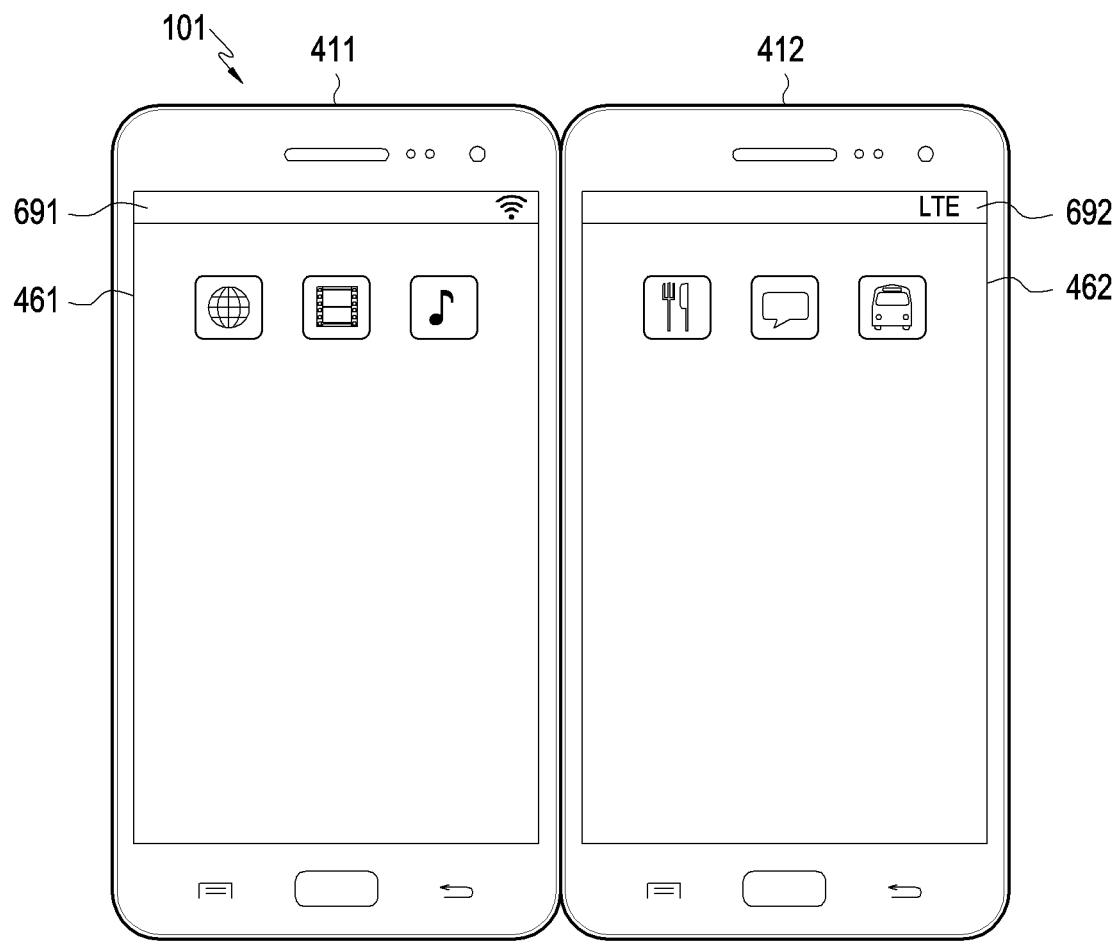
FIG. 22 illustrates displaying of icons corresponding to a WiFi communication network according to various embodiments of the present disclosure.

FIG. 22 illustrates displaying of icons corresponding to a WiFi communication network according to various embodiments of the present disclosure.

Referring to FIG. 22, the electronic device 101, e.g., the processor 120 may display an icon of at least one application corresponding to connected WiFi on the first display 461. For example, the processor 120 may display applications consuming much data, such as an Internet application, a video streaming application, and a music streaming application.

The description of the electronic device 101 is also applicable to a case where a plurality of screens are displayed on one display. Thus, when the plurality of screens are displayed on one display, the electronic device 101, e.g., the processor 120 may use one of a plurality of communication networks for an operation of an application displayed on each screen.

Figure 23:
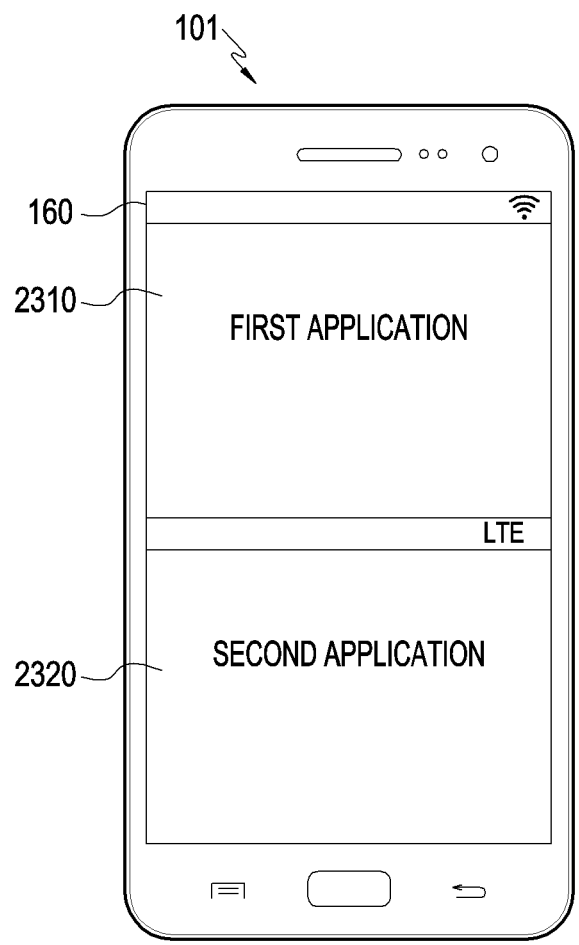
FIG. 23 illustrates a plurality of screens displayed on a single display according to various embodiments of the present disclosure.

FIG. 23 illustrates a plurality of screens displayed on a single display according to various embodiments of the present disclosure.

Referring to FIG. 23, the electronic device 101, e.g., the processor 120 may display a plurality of screens, a first screen 2310 and a second screen 2320 on the display 160. The electronic device, e.g., the processor 120 may determine a communication network corresponding to the first screen 2310 as the WiFi communication network and a communication network corresponding to the second screen 2320 as the LTE communication network. Thus, the electronic device, e.g., the processor 120 may use the WiFi communication network for an operation of a first application displayed on the first screen 2310 and the LTE communication network for an operation of a second application displayed on the second screen 2320.

The above description of use of the communication network corresponding to each of the plurality of screens displayed on one display is merely an example and the present disclosure is not limited thereto. Therefore, in addition to the above description, when the plurality of screens are displayed on one display, the components and operations described for the plurality of displays may also be applied.

A description will be made of a programming module through which the electronic device 101 may use a plurality of communication networks.

Figure 24:
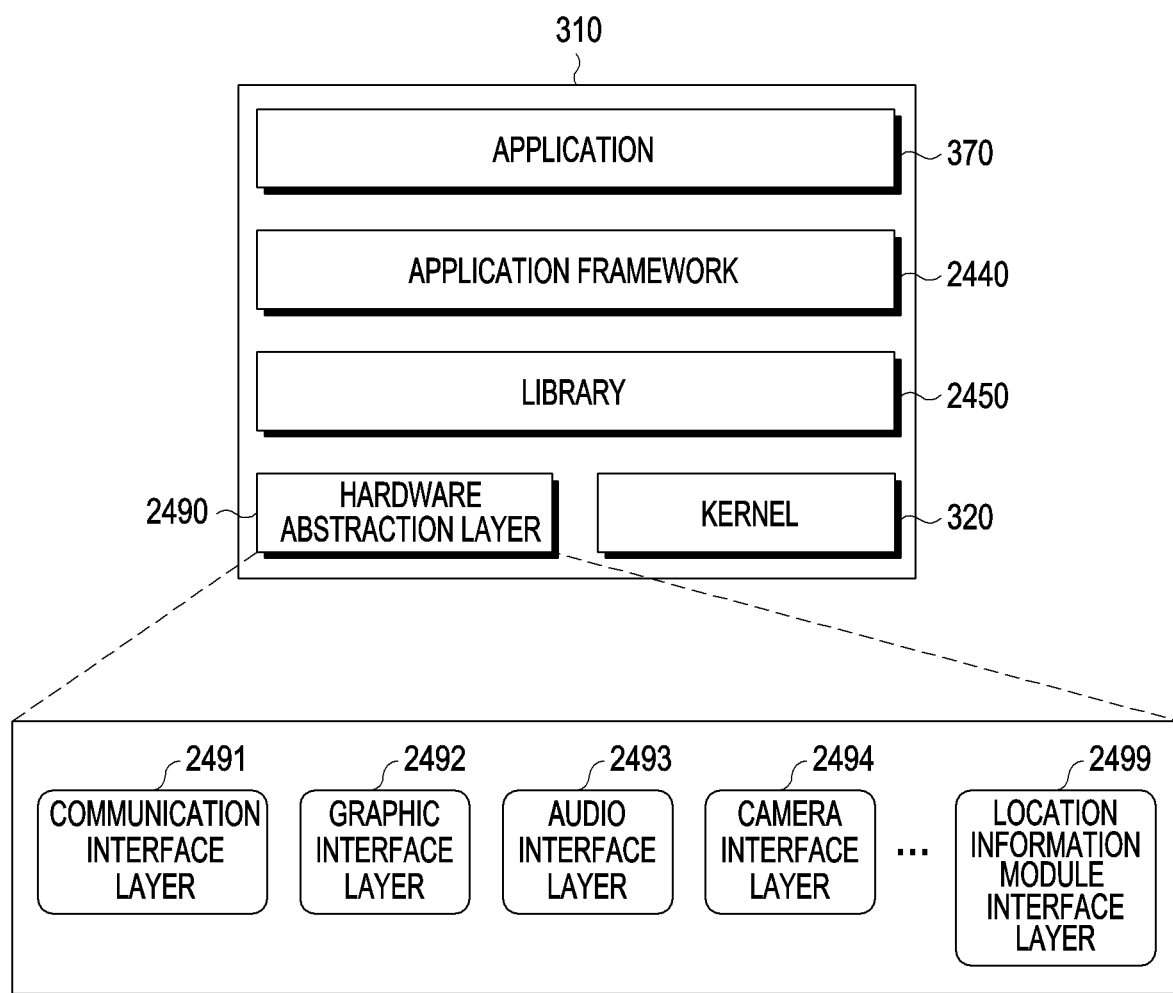
FIG. 24 is a block diagram of a programming module according to various embodiments of the present disclosure.

FIG. 24 is a block diagram of a programming module according to various embodiments of the present disclosure.

Referring to FIG. 24, the electronic device 101 may include a programming module 310 for using a plurality of communication networks. The programming module 310 may include an OS for controlling resources associated with an electronic device (e.g., the electronic device 101) and/or various applications (e.g., the application program 147) executed on the OS. The OS may include, for example, Android™, iOS™, Windows™, Symbian™, Tizen™, Bada™, or the like.

The programming module 310 may include an application 370, an application framework 2440, a library 2450, a hardware abstraction layer 2490, and a kernel 320. The programming module 310 may further include some or all of the components described above with reference to FIG. 3. At least a part of the programming module 310 may be pre-loaded on an electronic device or may be downloaded from an external device (e.g., the vehicle device 102, the electronic device 104, or the server 106).

The kernel 320 is a core part of an OS, and may provide a service necessary for execution of another part of the OS and applications.

The hardware abstraction layer 2490 may be an abstraction layer between physical hardware and software. The hardware abstraction layer 2490 may include an interface for accessing of the system to hardware. For example, the hardware abstraction layer 2490 may include one of a kernel driver and a user driver.

The hardware abstraction layer 2490 may include a layer for each hardware. For example, the hardware abstraction layer 2490 may include a communication interface layer 2491, a graphic interface layer 2492, an audio interface layer 2493, a camera interface layer 2494, and a location information module interface layer 2499.

The communication interface layer 2491 may be an interface layer related to the communication module 220.

The graphic interface layer 2492 may be an interface layer related to the display 260.

The audio interface layer 2493 may be an interface layer related to the audio module 280.

The camera interface layer 2494 may be an interface layer related to the camera module 291.

The location information module interface layer 2499 may be an interface layer related to a location information module, e.g., the GNSS module 227.

The library 2450 may include a class or a sub routine used when software is made. For example, the library 2450 may include a static library referred to when a compiler compiles a source file and a dynamic library used during execution of a program.

The application framework 2440 may include a class and a library for implementing an application standard structure for the OS.

The application 370 may include one or more applications capable of performing various functions. This has already been described and thus will not be described in detail at this time.

Figure 25:
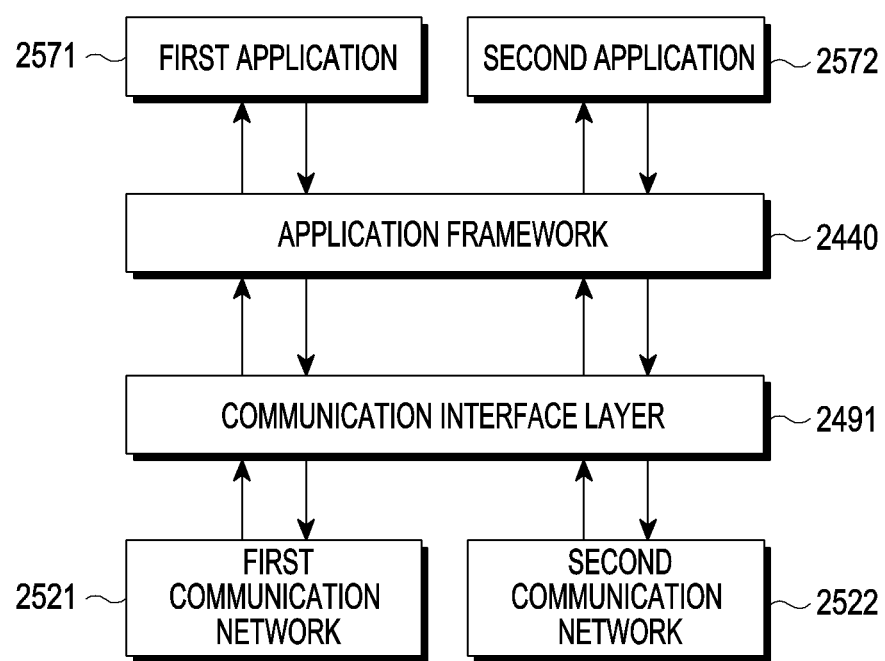
FIG. 25 is a conceptual view of use of a plurality of communication networks according to various embodiments of the present disclosure.

FIG. 25 is a conceptual view of use of a plurality of communication networks according to various embodiments of the present disclosure.

Referring to FIG. 25, the electronic device 101 uses a first communication network 2521 for an operation of a first application 2571 and a second communication network 2522 for an operation of a second application 2572. The electronic device 101 displays a screen of the first application 2571 on the first screen of the first display 461 and a screen of the second application 2572 on the second display 462. The communication interface layer 2491 distinguishes data transmitted from the first communication network 2521 from data transmitted from the second communication network 2522, and separately delivers the distinguished data to the application framework 2440. The application framework 2440 processes the distinguished data to correspond to each of the screen of the first application 2571 and the screen of the second application 2572. Thus, the first communication network 2521 may be used for the operation of the first application 2571 displayed on the first display 461, and the second communication network 2522 may be used for the operation of the second application 2572 displayed on the second display 462.

According to various embodiments of the present disclosure, a method for operating an electronic device includes displaying a screen of a first application on a first screen among a plurality of screens and using, for an operation of the first application, a first communication network corresponding to the first screen among a plurality of communication networks.

According to various embodiments of the present disclosure, the method may further include displaying a screen of a second application on a second screen among the plurality of screens and using, for an operation of the second application, a second communication network corresponding to the second screen among the plurality of communication networks.

According to various embodiments of the present disclosure, the method may further include receiving at least one data corresponding to at least one of the first communication network and the second communication network, distinguishing the received at least one data to correspond to the first application and the second application, and using the distinguished at least one data for an operation of the at least one of the first application and the second application.

According to various embodiments of the present disclosure, the using of the first communication network includes determining a communication network corresponding to the first screen and using the first communication network, which is the determined communication network, for the operation of the first application.

According to various embodiments of the present disclosure, the method may further include displaying a screen of the first application on the second screen and using, for the operation of the first application, the second communication network corresponding to the second screen among the plurality of communication networks.

According to various embodiments of the present disclosure, a method for operating an electronic device includes executing a first application, determining a communication network corresponding to the executed first application, and using the determined communication network for an operation of the executed first application.

According to various embodiments of the present disclosure, the method may further include displaying a screen of the executed first application on a first screen corresponding to the determined communication network.

According to various embodiments of the present disclosure, the method may further include displaying, on a second screen, a screen of the first application having been displayed on the first screen, obtaining an input regarding whether to use a communication network corresponding to the second screen for the operation of the first application, and using a communication network corresponding to the second screen for the operation of the first application, upon obtaining an input allowing use of the communication network corresponding to the second screen.

According to various embodiments of the present disclosure, the method may further include displaying an indication of communication network use disallowance on the second screen, when failing to obtain the input allowing use of the communication network corresponding to the second screen.

According to various embodiments of the present disclosure, an electronic device includes a communication module configured to communicate through at least one communication network, a plurality of displays including a first display and a second display, a memory, and a processor electrically connected with the memory, in which the memory stores instructions for causing the processor, when executed, to display a screen of a first application on the first display and to use, for an operation of the first application, a first communication network corresponding to the first display among a plurality of communication networks.

According to various embodiments of the present disclosure, the memory stores instructions for causing the processor, when executed, to display a screen of a second application on the second display and to use, for an operation of the second application, a second communication network corresponding to the second display among the plurality of communication networks.

According to various embodiments of the present disclosure, the memory stores instructions for causing the processor, when executed, to receive at least one data corresponding to at least one of the first communication network and the second communication network, to distinguish the received at least one data to correspond to the first application and the second application, and to use the distinguished at least one data for an operation of the at least one of the first application and the second application.

According to various embodiments of the present disclosure, the memory stores instructions for causing the processor, when executed, to determine a communication network corresponding to the first display and to use the first communication network, which is the determined communication network, for the operation of the first application.

According to various embodiments of the present disclosure, the memory stores instructions for causing the processor, when executed, to display a screen of the first application on the second display and to use, for the operation of the first application, the second communication network corresponding to the second display.

According to various embodiments of the present disclosure, the memory stores instructions for causing the processor, when executed, to determine a communication network corresponding to the second display and to use the second communication network, which is the determined communication network, for the operation of the first application displayed on the second display.

According to various embodiments of the present disclosure, an electronic device includes a communication module configured to communicate through at least one communication network, a plurality of displays including a first display and a second display, a memory, and a processor electrically connected with the memory, in which the memory stores instructions for causing the processor, when executed, to execute a first application, to determine a communication network corresponding to the executed first application, and to use the determined communication network for an operation of the executed first application.

According to various embodiments of the present disclosure, the memory stores instructions for causing the processor, when executed, to display a screen of the executed first application on the first display corresponding to the determined communication network.

According to various embodiments of the present disclosure, the memory stores instructions for causing the processor, when executed, to display, on the second display, a screen of the first application having been displayed on the first display, to obtain an input regarding whether to use a communication network corresponding to the second display for the operation of the first application, and to use a communication network corresponding to the second display for the operation of the first application, upon obtaining an input allowing use of the communication network corresponding to the second display.

According to various embodiments of the present disclosure, the memory stores instructions for causing the processor, when executed, to display an indication of communication network use disallowance on the second display, when failing to obtain the input allowing use of the communication network corresponding to the second display.

The embodiments disclosed herein have been provided for description and understanding of disclosed technical matters, and are not intended to limit the scope of the present disclosure Therefore, it should be construed that the scope of the present disclosure includes any change or other various embodiments based on the technical spirit of the present disclosure.

The invention claimed is:

1. A method for operating an electronic device, the method comprising:
   executing an application;
   controlling a first display to display an execution screen of the application based on using a first communication interface among a plurality of communication interfaces;
   receiving a user input for moving the execution screen displayed on the first display to a second display; and
   based on receiving the user input, controlling the second display to display the execution screen based on using a second communication interface among the plurality of communication interfaces,
   wherein the first communication interface is different from the second communication interface.

2. The method of claim 1, wherein the first display and the second display are rotatably connected with each other.

3. The method of claim 1, wherein the user input comprises a drag for the execution screen in a direction from the first display to the second display.

4. The method of claim 1, wherein the second display is configured to display information received based on the second communication interface.

5. The method of claim 4, further comprising:
controlling the first display to display the execution screen including first content received based on the first communication interface; and
controlling the second display to display the execution screen including second content received based on the second communication interface.

6. The method of claim 4, further comprising:
in response to controlling the second display to display the execution screen, controlling the first display to display another screen.

7. The method of claim 6, further comprising:
receiving a first user input for moving the execution screen displayed on the second display to the first display; and
controlling the first display to display the execution screen by using the first communication interface.

8. The method of claim 1, further comprising:
identifying whether the execution screen of the application is capable of being displayed on the second display; and
based on identifying that the execution screen of the application is capable of being displayed on the second display, controlling the second display to display the execution screen.

9. The method of claim 1, further comprising:
setting the application as one application among a plurality of applications that is capable of being displayed on the second display.

10. A non-transitory computer-readable medium having recorded thereon computer-executable instructions which when executed cause at least one processor to:
execute an application;
control a first display to display an execution screen of the application based on using a first communication interface among a plurality of communication interfaces;
receive a user input for moving the execution screen displayed on the first display to a second display; and
based on receiving the user input, control the second display to display the execution screen based on using a second communication interface among a plurality of communication interfaces,
wherein the first communication interface is different from the second communication interface.

11. The non-transitory computer-readable medium of claim 10, wherein the first display and the second display are rotatably connected with each other.

12. The non-transitory computer-readable medium of claim 10, wherein the user input comprises a drag for the execution screen in a direction from the first display to the second display.

13. The non-transitory computer-readable medium of claim 10, wherein the second display is configured to display information received based on the second communication interface.

14. The non-transitory computer-readable medium of claim 13, wherein the computer-executable instructions further cause the at least one processor to:
control the first display to display the execution screen including first content received based on the first communication interface; and
control the second display to display the execution screen including second content received based on the second communication interface.

15. The non-transitory computer-readable medium of claim 10, wherein the computer-executable instructions further cause the at least one processor to:
in response to controlling the second display to display the execution screen, control the first display to display another screen.

* * * * *